(12) United States Patent
Naito et al.

(10) Patent No.: US 6,431,338 B1
(45) Date of Patent: Aug. 13, 2002

(54) CLUTCH APPARATUS

(75) Inventors: Takao Naito, Nagoya; Tomomitsu Terakawa, Anjyo; Naoyuki Maki, Kariya; Tetsuya Kohno, Okazaki, all of (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 37 days.

(21) Appl. No.: 09/737,764

(22) Filed: Dec. 18, 2000

(30) Foreign Application Priority Data

Dec. 24, 1999 (JP) .......................................... 11-366858

(51) Int. Cl.⁷ .............................................. F16D 13/75
(52) U.S. Cl. ................ 192/70.25; 192/84.6; 192/111 A
(58) Field of Search ............................. 192/70.25, 84.6, 192/30 W, 111 A; 477/180; 701/67, 68; 340/453, 454

(56) References Cited

U.S. PATENT DOCUMENTS

| 3,286,803 A | * 11/1966 | Zeidler | 192/111 A |
| 4,099,604 A | * 7/1978 | Higgerson | 192/111 A |
| 4,474,274 A | * 10/1984 | Lutz et al. | 192/30 W |
| 4,561,530 A | * 12/1985 | Parsons et al. | 477/176 |
| 4,705,151 A | * 11/1987 | Leigh-Monstevens et al. | 192/111 A |

FOREIGN PATENT DOCUMENTS

| JP | A 05-215150 | 8/1993 |
| JP | A 07-139562 | 5/1995 |
| JP | A 11-315853 | 11/1999 |

* cited by examiner

Primary Examiner—Richard M. Lorence
(74) Attorney, Agent, or Firm—Oliff & Berridge, PLC

(57) ABSTRACT

A clutch apparatus includes a clutch disk; a pressure plate for moving the clutch disk through application of pressure; a diaphragm spring for applying a force to the pressure plate so as to urge the pressure plate toward a flywheel; a release bearing for pressing a central portion of the diaphragm spring; a release fork; and an actuator. The pressure plate and an outer circumferential portion of the diaphragm spring are in contact with each other via taper portions of the pressure plate and an adjust wedge member. The clutch apparatus counts the number of clutch operations. In order to obtain a desirable press-contact load according to the counted number of clutch operations, the adjust wedge member is rotated with respect to the pressure plate to thereby modify the attitude of the diaphragm spring.

17 Claims, 19 Drawing Sheets

<AT THE TIME OF ENGAGEMENT>

<AT THE TIME OF ORDINARY DISENGAGEMENT>

<AT THE TIME OF CONTACT WITH STOPPER>

<AT THE TIME OF OVER STROKE>

US 6,431,338 B1

CLUTCH APPARATUS

BACKGROUND OF THE INVENTION

1. Field of the Invention

The present invention relates to a clutch apparatus for a vehicle for transmitting torque between a drive unit, such as an internal combustion engine, and a transmission. More particularly, the invention relates to a clutch apparatus capable of appropriately coping with time-course variations in characteristics of, for example, a clutch disk and an actuator.

2. Description of the Related Art

Generally, in a clutch apparatus for a vehicle, the attitude (posture) of a diaphragm spring varies with wear of clutch facing (a clutch disk), resulting in an increase in an operating force (a load imposed on a clutch cover) required to disengage a clutch (break the coupling). In order to cope with this problem, according to the apparatus disclosed in Japanese Patent Application Laid-Open (kokai) No. 215150/1993, the height of a fulcrum of a diaphragm spring is modified according to a load imposed on a clutch cover at the time of clutch operation (a load imposed on a sensor diaphragm fixedly attached to the clutch cover), so as to modify the attitude of the diaphragm spring, thereby compensating for variations in operating characteristics of a clutch associated with wear of the clutch facing.

In the clutch apparatus for a vehicle, there exists a sliding portion, located, for example, between the diaphragm bearing and a release bearing, between the release bearing and the input shaft of a transmission, or between a release fork and a fulcrum member on which the release fork pivots. The sliding resistance of the sliding portion varies according to the number of operations of the clutch apparatus (the number of changeovers of the state of the clutch disk from engagement with a flywheel to disengagement from the flywheel or vice versa). Also, the friction coefficient of the clutch disk is low at the early stage of use and then increases before it substantially plateaus at a predetermined magnitude. Furthermore, output characteristics of an actuator (for example, an electric motor) for moving the release fork through application of pressure vary with time. Accordingly, even when wear of clutch facing is sufficiently little not to raise a problem or even when the wear is compensated for by means of, for example, the above conventional technique, operating characteristics of a clutch (particularly clutch response characteristic) vary according to the number of clutch operations.

SUMMARY OF THE INVENTION

An object of the present invention is to provide a clutch apparatus capable of solving the above-mentioned problems in the conventional clutch apparatus.

To achieve the above object, the present invention provides a clutch apparatus for a vehicle, comprising a clutch disk disposed opposite a flywheel, which rotates unitarily with an output shaft of a drive unit; a pressure plate for applying a press-contact load to said clutch disk so as to press said clutch disk toward said flywheel to thereby engage said clutch disk with said flywheel; a diaphragm spring for causing said pressure plate to generate the press-contact load; a release mechanism for applying a force to a predetermined portion of said diaphragm spring to thereby deform said diaphragm spring for disengaging said clutch disk from said flywheel; and adjustment means for modifying the press-contact load according to the number of changeovers of the state of said clutch disk from disengagement to engagement or vice versa.

The adjustment means above mentioned modifies the press-contact load according to the number of changeovers of the state of the clutch disk from disengagement to engagement or vice versa, whereby clutch operation can be modified, for example, to compensate for variations in sliding resistance of the sliding portion. Therefore, the clutch can keep desired operating characteristics according to the present invention. Also, the press-contact load can be modified so as to be appropriate for a variation in the friction coefficient of the clutch disk according to the present invention.

Preferably, said adjustment means modifies the press-contact load such that the press-contact load decreases, continuously or stepwise, as the number of changeovers of the state of said clutch disk from disengagement to engagement or vice versa increases, in order to have an appropriate press-contact load for at least the friction coefficient of the clutch disk.

Alternatively, said adjustment means modifies the press-contact load such that the press-contact load decreases as the number of changeovers of the state of said clutch disk from disengagement to engagement or vice versa increases when the number of changeovers is smaller than a predetermined number, and the press-contact load increases as the number of changeovers increases when the number of changeovers is larger than the predetermined number, in order to have an appropriate press-contact load for at least the friction coefficient of the clutch disk.

Preferably, a clutch apparatus moves a member to apply the force to the diaphragm and said adjustment means modifies the press-contact load such that an actual stroke of said member under becomes equal to the estimated stroke of said member certain conditions to thereby make adjustment.

It is another object of the present invention to provide a clutch apparatus that can automatically compensate for time-course variations in clutch-operating characteristics without causing disadvantage to the normal driving of the vehicle by limiting the adjustment timing to a certain timing.

It is another object of the present invention to provide a clutch control apparatus that can automatically compensate for time-course variations in clutch-operating accurately by limiting the adjustment timing to a certain timing.

Other features and advantages of the present invention will be apparent from the following description taken in connection with the accompanying drawings.

DESCRIPTION OF THE PREFERRED EMBODIMENTS

Embodiments of the present invention will next be described in detail with reference to the drawings.

Figure 1:
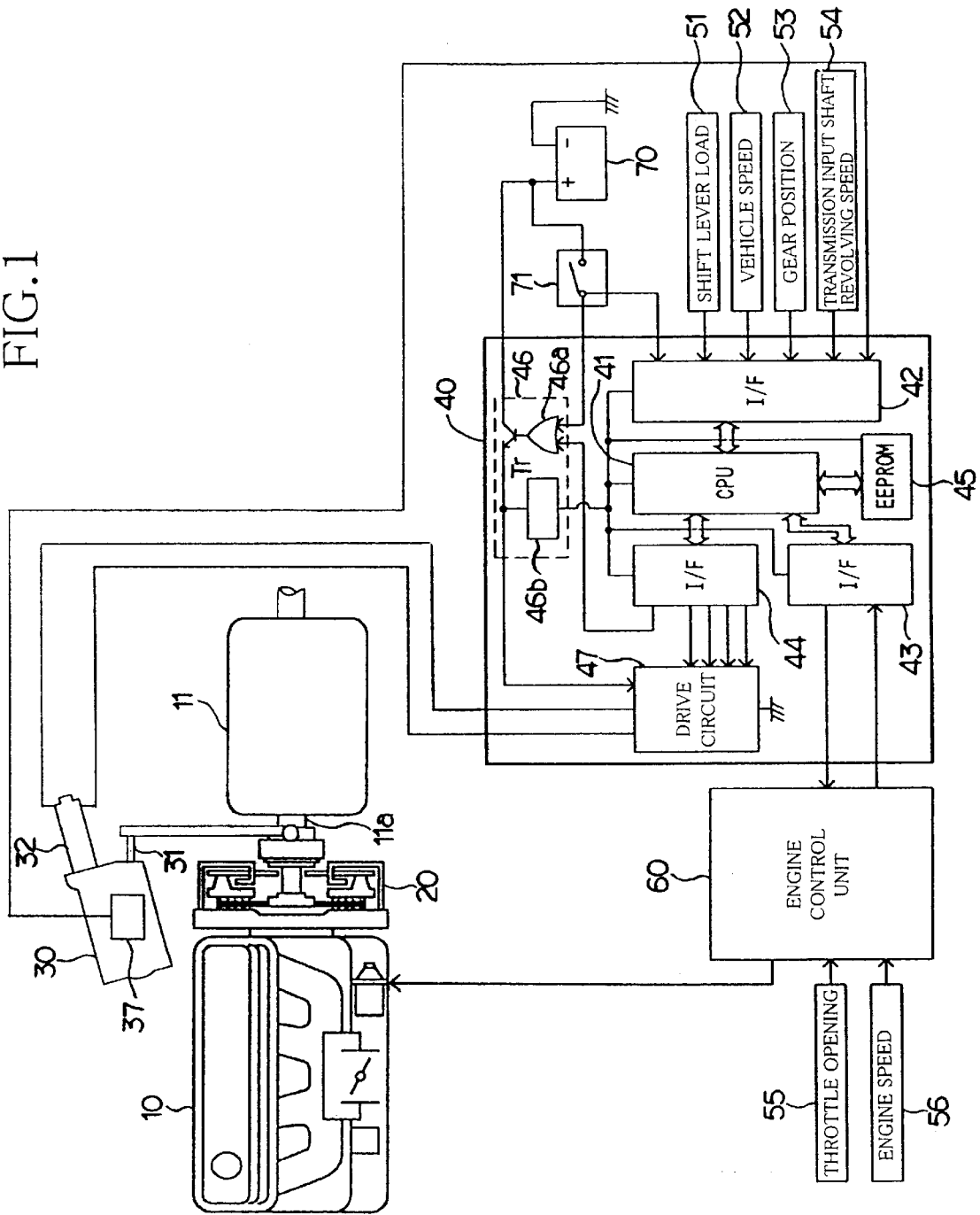
FIG. 1 is a schematic diagram showing a clutch apparatus according to a first embodiment of the present invention.

A clutch apparatus according to a first embodiment of the present invention will be described with reference to FIGS. 1 to 13. As schematically shown in FIG. 1, the clutch apparatus includes a frictional clutch 20 disposed between an engine 10, serving as a drive unit, and a transmission 11; an actuator 30 for operating the clutch 20; and a clutch control circuit 40 for outputting a drive instruction signal to the actuator 30.

Figure 2:
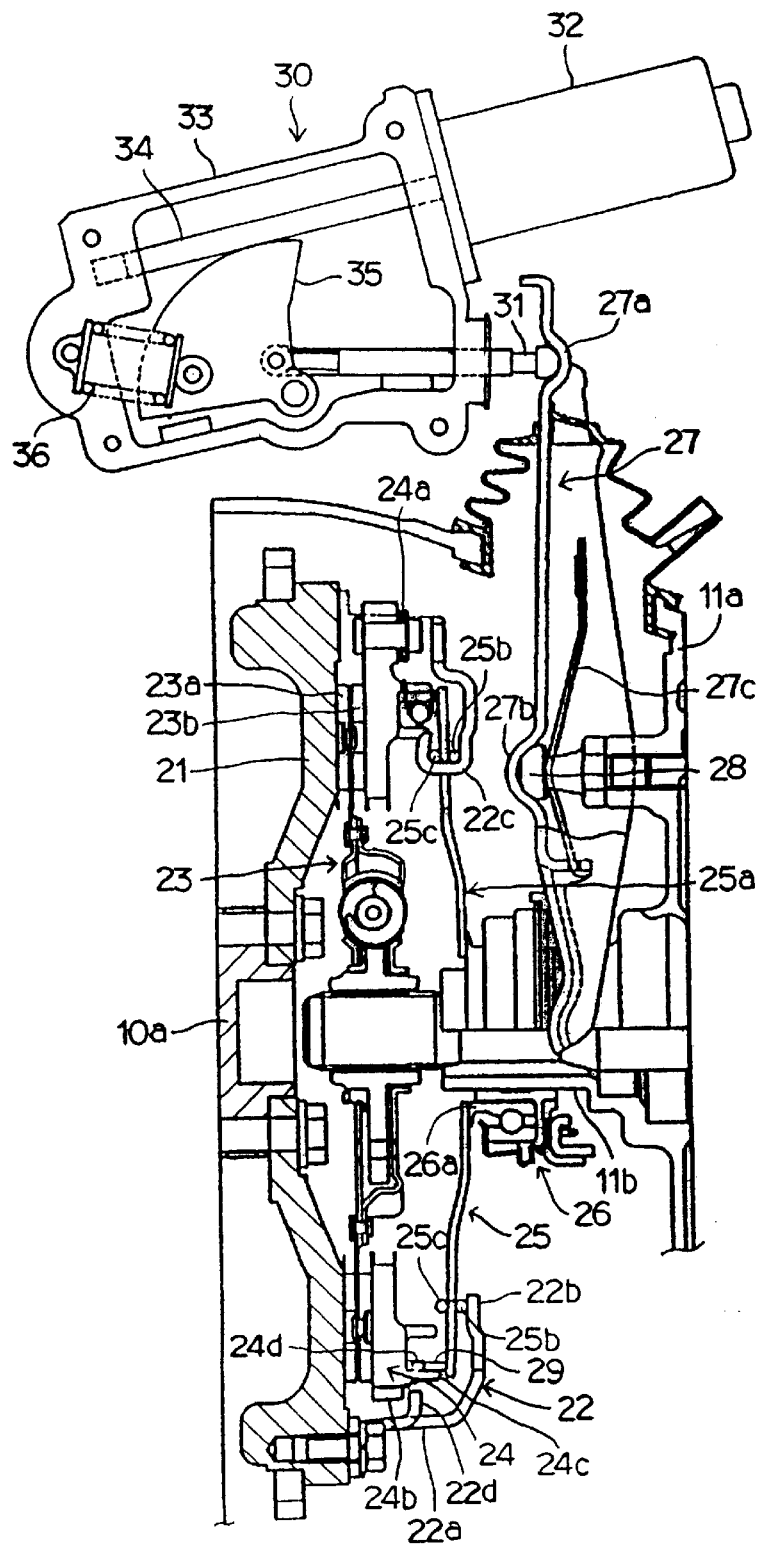
FIG. 2 is a schematic sectional view of a clutch shown in FIG. 1.

FIG. 2 shows the details of the frictional clutch 20. As shown in FIG. 2, main components of the frictional clutch 20 are a flywheel 21, a clutch cover 22, a clutch disk 23, a pressure plate 24, a diaphragm spring 25, a release bearing 26, a release fork 27, a pivot support member 28 fixedly attached to a transmission casing 11a, and an adjust wedge member 29. Clutch components attached unitarily to the clutch cover 22, such as the pressure plate 24, the diaphragm spring 25, and the adjust wedge member 29, may be called a clutch cover assembly.

The flywheel 21 is a disk of cast iron and is fixedly attached to a crank-shaft (output shaft of a drive unit) 10a of the engine 10 by means of bolts for unitary rotation with the crank-shaft 10a.

The clutch cover 22 has a substantially cylindrical shape and includes a cylindrical portion 22a; a flange portion 22b extending radially inward from the cylindrical portion 22a; a plurality of holder portions 22c formed at the inner circumferential edge of the cylindrical portion 22a while been arranged equally spaced in a circumferential direction; and pressure plate stopper portions 22d, which is bent radially inward from the cylindrical portion 22a. A portion extending radially outward from the cylindrical portion 22a is fixedly attached to the flywheel 21 by means of bolts, so that the clutch cover 22 rotates unitarily with the flywheel 21.

The clutch disk 23 is a frictional disk for transmitting the power of the engine 10 to the transmission 11 and is disposed between the flywheel 21 and the pressure plate 24. A central portion of the clutch disk 23 is spline connected with an input shaft of the transmission 11 so that the clutch disk can move axially. Clutch facings 23a and 23b are fixedly attached to the opposite sides of an outer circumferential portion of the clutch disk 23 by means of rivets. The clutch facings 23a and 23b are formed of a friction material.

The pressure plate 24 can move in a reciprocating manner along the axial direction of the input shaft of the transmission 11. The pressure plate 24 presses the clutch disk 23 toward the flywheel 21 such that the clutch disk 23 is gripped between the pressure plate 24 and the flywheel 21 to thereby be engaged with the flywheel 21 for unitary rotation therewith. The pressure plate 24 is connected to the clutch cover 22 by means of straps 24a so as to rotate with the clutch cover 22.

Figure 3:
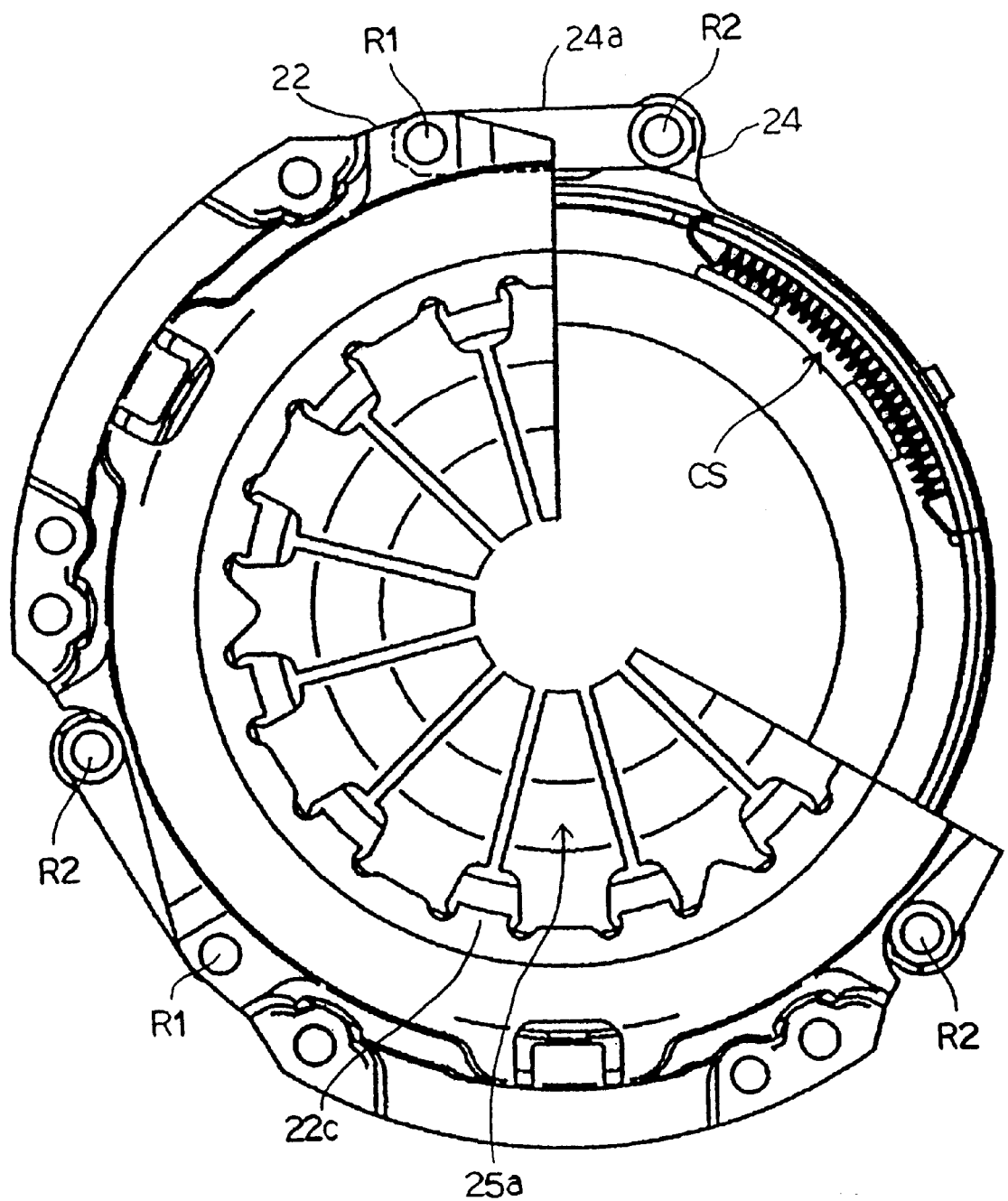
FIG. 3 is a front view of the clutch shown in FIG. 1.

The strap 24a assumes the form of a laminate of a plurality of thin leaves for spring use. As shown in FIG. 3, one end of the strap 24a is fixedly attached to an outer circumferential portion of the clutch cover 22 by means of a rivet R1, whereas the other end is fixedly attached to a portion of the pressure plate 24 which projects from an outer circumferential portion of the pressure plate 24 by means of a rivet R2. The thus-attached straps 24a apply a force to the pressure plate 24 in an axial direction urging the pressure plate 24 to move away from the flywheel 21.

As shown in FIGS. 2 and 4, a contact portion 24b is formed on the outermost circumferential portion of the pressure plate 24. When the pressure plate 24 moves by a certain amount toward the diaphragm spring 25, the contact portion 24b abuts the pressure plate stopper portion 22d of the clutch cover 22. A guide portion 24c is formed on the pressure plate 24 on the radially inward side of the contact portion 24b in a condition standing toward the diaphragm spring 25. As shown in FIG. 5, a plurality of saw-toothed taper portions 24d are formed on the pressure plate 24 on the radially inward side of the guide portion 24c in a condition standing toward the diaphragm spring 25.

As shown in FIG. 3, the diaphragm spring 25 is composed of 12 resilient plate members 25a (hereinafter called "lever members 25a") arranged radially along the inner circumferential wall of the cylindrical portion 22a of the clutch cover 22. As shown in FIG. 2, each of the lever members 25a is held by the holder portions 22c of the clutch cover 22 via a pair of annular fulcrum members 25b and 25c. Thus, the lever members 25a can pivot on the ring members 25b and 25c with respect to the clutch cover 22.

An adjust wedge member 29, which serves as a portion of an adjustment member (adjustment means), is disposed between the taper portions 24d of the pressure plate 24 and an outer circumferential portion of the diaphragm spring 25. The adjust wedge member 29 is an annular member. As shown in FIG. 5, the adjust wedge member 29 includes a plurality of taper portions 29a, which assume the same shape as that of the taper portions 24d of the pressure plate 24. The taper portions 29a of the adjust wedge member 29 and the corresponding taper portions 24d of the pressure plate 24 abut each other at the corresponding taper planes TP. An end face of the adjust wedge member 29 which faces the diaphragm spring 25 (upper end face in FIG. 5) is flat. The adjust wedge member 29 forms a transmission path for transmitting a force between the pressure plate 24 and the diaphragm spring 25. The adjust wedge member 29 transmits to the pressure plate 24 a force applied to the diaphragm spring 25 and a force generated by the diaphragm spring 25.

Cuts 29b are formed at appropriate positions on the end face of the adjust wedge member 29 which faces the diaphragm spring 25. Through-holes 24e are formed at appropriate positions on the taper portions 24d of the pressure plate 24. End portions of a stretched coil spring CS are caught by the corresponding cut 29b and through-hole 24e. The thus-installed coil springs CS apply a force to the pressure plate 24 and the adjust wedge member 29 in such a manner as to rotate the pressure plate 24 and the adjust wedge member 29 in mutually opposite directions such that the tooth-crest of each of the taper portions 24d of the pressure plate 24 and the corresponding tooth-crest of each of the taper portions 29a of the adjust wedge member 29 mutually approach.

The release bearing 26 is slidably supported on a support sleeve 11b, which is supported by the transmission casing 11a in such a manner as to surround the input shaft of the transmission 11. The release bearing 26 forms a force-application portion 26a for moving inner-end portions of the lever members 25a (central portion of the diaphragm spring 25) toward the flywheel 21 through application of pressure.

The release fork 27 (fork member) is adapted to axially slide the release bearing 26 according to the operation of the actuator 30. One end of the release fork 27 abuts the release bearing 26, whereas a contact portion 27a located at the other end abuts an end of a rod (member) 31 of the actuator 30. The release fork 27 is attached to the pivot support member 28 by means of a spring 27c fixedly attached to the transmission casing 11a. A substantially central portion 27b of the release fork 27 is supported on the pivot support member 28 such that the release fork 27 swings on the pivot support member 28.

The actuator 30 is adapted to move the rod 31 in a reciprocating manner. The actuator 30 includes an electric (DC) motor 32 and a housing 33, which supports the electric motor 32 and is fixed in an appropriate place within a vehicle. The housing 33 accommodates a rotating shaft 34, which is rotated by the electric motor 32; a sector gear 35 (worm wheel), which assumes the form of a fan in a side view and is swingably supported by the housing 33; and an assist spring 36.

The rotating shaft 34 is a worm and engaged with an arc portion of the sector gear 35. A root end portion of the rod 31 (an end portion opposite that in contact with the release fork 27) is pivotably supported by the sector gear 35. As the electric motor 32 rotates, the sector gear 35 rotates, thereby causing the rod 31 to move in a reciprocating manner with respect to the housing 33.

The assist spring 36 is compressed while the sector gear 35 swings within a predetermined range. One end of the assist spring 36 is caught at a rear-end portion of the housing 33, whereas the other end is caught by the sector gear 35. Thus, the assist spring 36 applies a force to the sector gear 35 in a direction urging the sector gear 35 to rotate clockwise to thereby urge the rod 31 to move rightward in FIG. 2, thereby assisting the electric motor 32 to move the rod 31 rightward.

Referring again to FIG. 1, the clutch control circuit 40 includes a microcomputer (CPU) 41, interfaces 42 to 44, an EEPROM 45, a power circuit 46, and a drive circuit 47. The CPU 41 contains a ROM in which a program and a map (a look-up table), which will be described later, are stored, and a RAM.

The interface 42 is connected to the CPU 41 via a bus as well as to a shift lever load sensor 51 for detecting a load which is generated when the shift lever of transmission is operated (shift lever load); a vehicle speed sensor 52 for detecting a vehicle speed V; a gear position sensor 53 for detecting an actual transmission gear position; a transmission input shaft revolving-speed sensor 54; and a stroke sensor 37 fixedly attached to the actuator 30 and adapted to detect a stroke ST (actual stroke ST) of the rod 31 through detection of the swing angle of the sector gear 35. The interface 42 supplies the CPU 41 with detection signals received from these sensors.

The interface 43 is connected to the CPU 41 via a bus as well as to an engine control unit 60 in a bidirectionally communicating manner. Thus, the CPU 41 of the clutch control circuit 40 can obtain information collected by a throttle opening angle sensor 55 and an engine speed sensor 56 through the engine control unit 60.

The interface 44 is connected to the CPU 41 via a bus as well as to the drive circuit 47 and one input terminal of an OR circuit 46a of the power circuit 46 so as to send an appropriate signal to the drive circuit 47 and the OR circuit 46a according to an instruction from the CPU 41.

The EEPROM 45 is a nonvolatile memory capable of retaining data even when no power is supplied thereto. The EEPROM 45 is connected to the CPU 41 via a bus and adapted to store data received from the CPU 41 and to supply stored data to the CPU 41, while powered.

The power circuit 46 includes the OR circuit 46a; a power transistor Tr whose base is connected to an output terminal of the OR circuit 46a; and a constant-voltage circuit 46b. The collector of the power transistor Tr is connected to the plus terminal of a battery 70 mounted on the vehicle, whereas the emitter of the power transistor Tr is connected to the constant-voltage circuit 46b and the drive circuit 47. Thus, when the power transistor Tr is turned on, power is supplied to the constant-voltage circuit 46b and the drive circuit 47. The constant-voltage circuit 46b is adapted to convert the battery voltage to a predetermined constant voltage (5 V) and connected to the CPU 41, the interfaces 42 to 44, and the EEPROM 45 so as to supply power thereto. One terminal of an ignition switch 71, which is turned on or off by a driver, is connected to the other input terminal of the OR circuit 46a. The other terminal of the ignition switch 71 is connected to the plus terminal of the battery 70. The terminal of the ignition switch 71 connected to the OR circuit 46a is also connected to the interface 42, so that the CPU 41 can detect the on/off state of the ignition switch 71.

The drive circuit 47 contains four switching elements (not shown) which go on or off in response to an instruction signal received via the interface 44. These switching elements constitute a known bridge circuit and are selectively turned on with their ON periods being controlled. Thus, the drive circuit 47 supplies power to the electric motor 32 such that a current of a certain intensity flows to the electric motor 32 in a predetermined direction or in a direction opposite the predetermined direction.

The engine control unit 60 is mainly composed of an unillustrated microcomputer and adapted to control, for example, the amount of fuel to be injected and ignition timing. As mentioned previously, the engine control unit 60 is connected to the throttle opening angle sensor 55 for detecting a throttle opening angle TA of the engine 10 and the engine speed sensor 56 for detecting a rotational speed NE of the engine 10 so as to receive signals from the sensors 55 and 56 and so as to process the received signals.

Next, the operation of the thus-configured clutch apparatus will be described. In contrast to conventional driver-effected clutch pedal operation, in this clutch apparatus, the actuator 30 automatically performs a clutch engagement/disengagement operation. Specifically, the clutch engagement/disengagement operation is performed when the CPU 41 detects, for example, any one of the following conditions: (1) a vehicle is shifting from a traveling state to a stopping state (the rotational speed of the input shaft of the transmission has dropped to or below a predetermined value); (2) a load detected by the shift lever load sensor 51 has increased to or above a predetermined value (the driver's intention to shift gears has been confirmed); and (3) an accelerator pedal is stepped on when the vehicle is halted.

There will be described an operation when the clutch is engaged so as to transmit the power of the engine 10 to the transmission 11. First, in response to an instruction signal from the clutch control circuit 40, the drive circuit 47 applies a predetermined current to the electric motor 32 to thereby rotate the electric motor 32. As a result, the sector gear 35 rotates counterclockwise in FIG. 2, causing the rod 31 to move leftward.

Meanwhile, the release bearing 26 receives a force which the diaphragm spring 25 applies thereto in a direction urging the release bearing 26 to move away from the flywheel 21 (rightward in FIG. 2). This force is transmitted to the release fork 27 via the release bearing 26 and urges the release fork 27 to rotate counterclockwise in FIG. 2 on the pivot support member 28. Accordingly, when the rod 31 moves leftward in FIG. 2, the release fork 27 rotates counterclockwise, and a central portion of the diaphragm spring 25 moves away from the flywheel 21.

At this time, the diaphragm spring 25 swings (i.e., undergoes change in attitude) about the ring members 25b and 25c, thereby moving the adjust wedge member 29, which abuts an outer circumferential portion of the diaphragm spring 25, toward the flywheel 21 through application of pressure. As a result, the pressure plate 24 receives a force which urges the pressure plate 24 toward the flywheel 21 via the taper portion 24d, thereby gripping the clutch disk 23 in cooperation with the flywheel 21. Thus, the clutch disk 23 is engaged with the flywheel 21 to thereby rotate unitarily with the flywheel 21, thereby transmitting the power of the engine 10 to the transmission 11.

Next will be described an operation to disengage the clutch so as not to transmit the power of the engine 10 to the transmission 11. First, the electric motor 32 is rotated so as to rotate the sector gear 35 clockwise in FIG. 2. The rod 31 moves rightward in FIG. 2 and applies a rightward force to the contact portion 27a of the release fork 27. The release fork 27 rotates clockwise in FIG. 2 on the pivot support member 28, thereby moving the release bearing 26 toward the flywheel 21 through application of pressure.

Thus, the diaphragm spring 25 receives a force directed towards the flywheel at the central portion of the diaphragm spring 25, i.e., at the force application portion 26a. As a result, the diaphragm spring 25 swings (i.e., undergoes change in attitude) about the ring members 25b and 25c, thereby causing the outer circumferential portion of the diaphragm spring 25 to move away from the flywheel 21. Accordingly, there is reduced the force which presses the pressure plate 24 toward the flywheel 21 via the adjust wedge member 29. Since the pressure plate 24 is connected to the clutch cover 22 by means of the straps 24a in such a manner as to be always subjected to a force which urges the pressure plate 24 to move away from the flywheel 21, this force causes the pressure plate 24 to move slightly away from the clutch disk 23. As a result, the clutch disk 23 becomes free, thereby establishing a state in which the power of the engine 10 is not transmitted to the transmission 11.

Figure 4A:
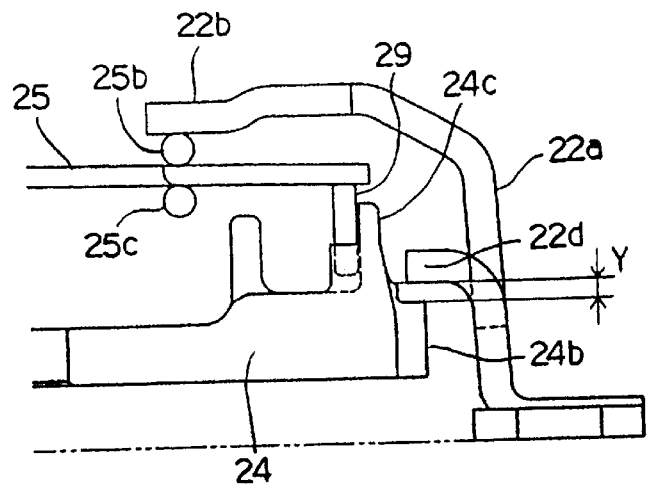
FIGS. 4A to 4C are views for explaining action of the clutch shown in FIG. 1.
Figure 5:
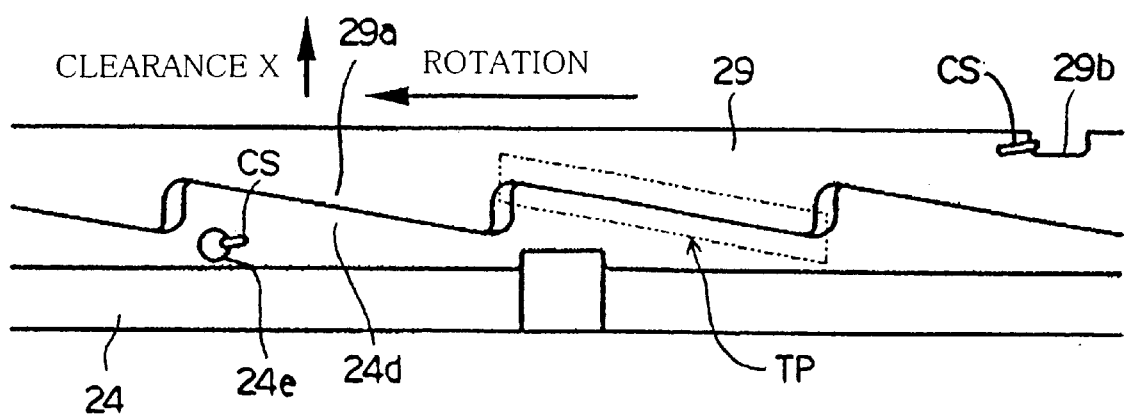
FIG. 5 is a view for explaining action of the clutch (adjustment member) shown in FIG. 1.

When the clutch is to be disengaged during regular vehicle operation, the stroke of the rod 31 is controlled to a value ST0 so as to maintain a predetermined distance Y between the contact portion 24b of the pressure plate 24 and the pressure plate stopper portion 22d of the clutch cover 22 as shown in FIG. 4A.

When a vehicle equipped with the clutch 20 is used (driven), the clutch disk 23 is controlled so as to be engaged with, half engaged with (a so-called half clutch operation), or disengaged from the flywheel 21. As such a clutching operation is repeated, clutch-operating characteristics vary; particularly, in time required for shift from disengagement to engagement or vice versa (hereinafter called the "clutch response time"; clutch performance represented in terms of clutch response time is called the "clutch response characteristic"). The clutch apparatus of the present embodiment automatically compensates for time-course variations in clutch-operating characteristics so as to obtain desired clutch-operating characteristics. Next will be described the principle of the above-mentioned compensation employed in the clutch apparatus.

Figure 6A:
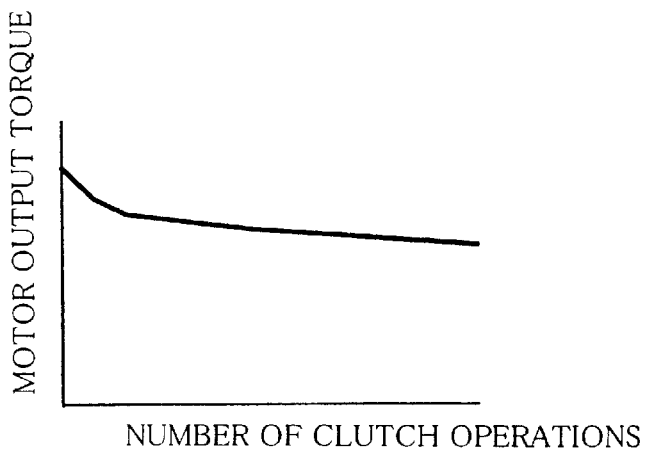
FIG. 6A is a diagram showing time-course variations in output characteristics of an electric motor shown in FIG. 1.

First, time-course variations involved in the electric motor 32 will be described. As shown in FIG. 6A, even when a current flowing to the electric motor 32 remains unchanged, the output torque of the electric motor 32 gradually decreases with the number of changeovers of the state of the clutch from engagement to disengagement or vice versa; i.e., with the number of clutch operations. This is because a motor current which contributes to generation of torque decreases substantially due to carbon generated in the vicinity of motor windings.

Figure 6B:
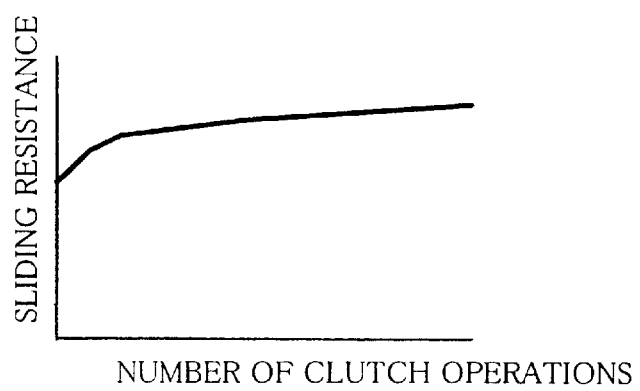
FIG. 6B is a diagram showing time-course variations in sliding resistance at a sliding portion of the clutch shown in FIG. 1.

The clutch apparatus of the present embodiment includes sliding portions, located, for example, between the diaphragm spring 25 and the release bearing 26, between the release bearing 26 and the support sleeve 11b, between the release fork 27 and the pivot support member 28, and between an end portion of the rod 31 and the release fork 27. As shown in FIG. 6B, sliding resistance at the sliding portions gradually increases with the number of clutch operations.

Figure 6C:
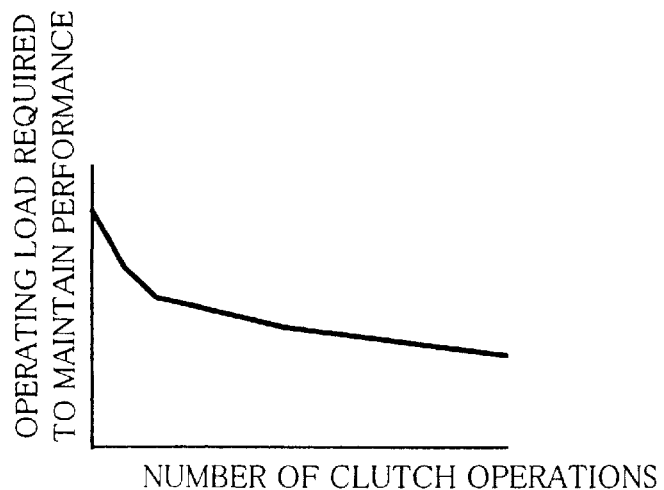
FIG. 6C is a diagram showing an operating-load required to maintain clutch performance in consideration of time-course variations in the electric motor and sliding portions.

A decrease in the output torque of the electric motor 32 or an increase in sliding resistance at sliding portions causes an increase in clutch response time. On the other hand, clutch response time can be reduced through decrease of a force required for the actuator 30 to move the rod 31 (operating load). Thus, as shown in FIG. 6C, by gradually decreasing the operating load with the number of clutch operations, clutch-operating characteristics can be maintained intact (particularly, clutch response time can be held constant).

Figure 7A:
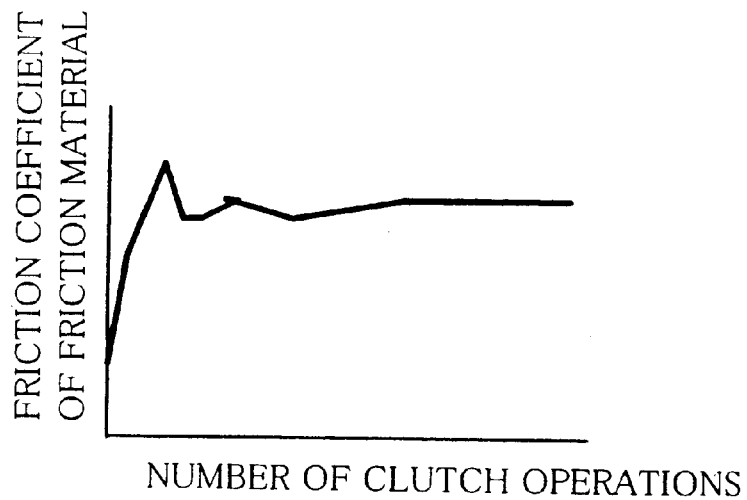
FIG. 7A is a diagram showing time-course variations in the friction coefficient of a friction material of which a clutch facing shown in FIG. 1 is made.
Figure 7B:
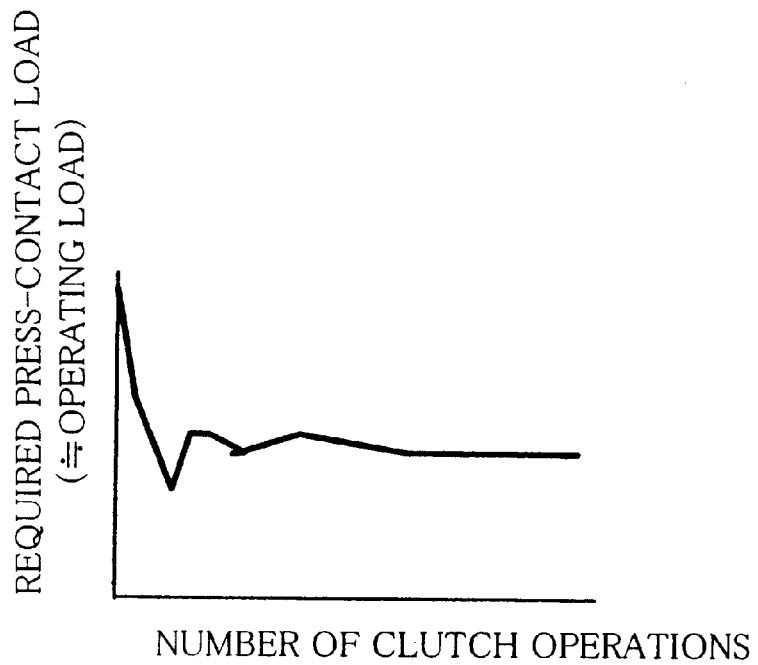
FIG. 7B is a diagram showing a required press-contact load in consideration of time-course variations in the friction material.

As shown in FIG. 7A, the friction coefficient of a friction material of which the clutch facings 23a and 23b are made is low at a small number of clutch operations and then increases sharply with the number of clutch operations before reaching a plateau at a certain value. The relationship TC=A×μ×P holds, wherein TC is torque to be transmitted by the clutch disk 23 (hereinafter called the "clutch torque"); A is a predetermined coefficient; μ is the above-mentioned friction coefficient of a friction material; and P is a press-contact load for pressing the clutch disk 23 against the flywheel 21. Accordingly, as shown in FIG. 7B, by modifying a load required to maintain complete engagement of the clutch disk 23 with the flywheel 21 (hereinafter called the "required press-contact load"), according to time-course variations in the friction coefficient μ; i.e., according to the number of clutch operations, there can be reduced unnecessary work which the actuator 30 would otherwise perform.

Figure 8:
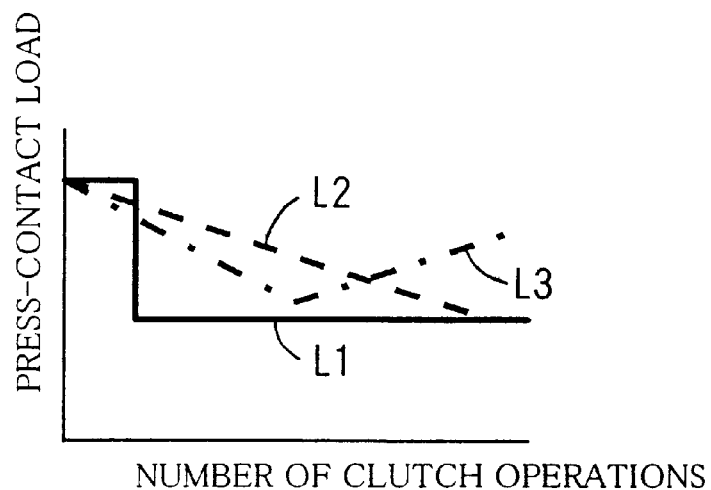
FIG. 8 is a diagram showing the relationship between an ideal press-contact load and the number of clutch operations.

In consideration of, for example, the above-described variations in output characteristics of the electric motor 32, in sliding resistance at sliding portions, and in friction coefficient of a friction material, it is generally preferable that the press-contact load be decreased with the number of clutch operations stepwise as represented by a line L1 (solid line) in FIG. 8, or continuously as represented by a line L2 (dashed line) in FIG. 8.

Figure 9:
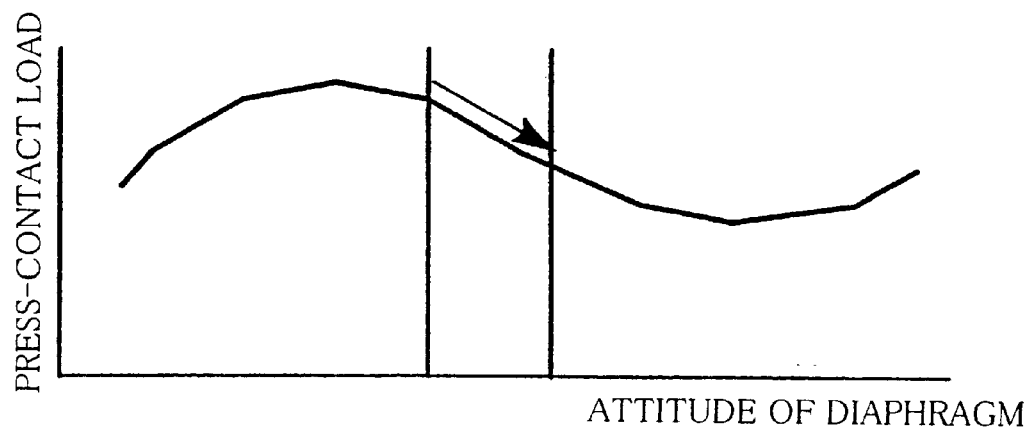
FIG. 9 is a diagram showing variation of a press-contact load with the attitude of a diaphragm spring.

As shown in FIG. 9, the press-contact load varies with the attitude of the diaphragm spring 25 as observed when the clutch disk 23 is completely engaged with the flywheel 21. In FIG. 9, an increase in the attitude of the diaphragm spring 25 (rightward movement along the x-axis in FIG. 9) means that the diaphragm spring 25 becomes flatter (in FIG. 2, the angle between the diaphragm spring 25 and the input shaft of the transmission approaches 90 degrees). In FIG. 9, the modification of the attitude of the diaphragm spring 25 as represented by the arrow means a reduction in the load of the diaphragm spring 25.

In the present embodiment, the number of clutch operations is counted (measured). In order to obtain an appropriate press-contact load according to the counted number of clutch operations, the actuator 30 is caused to undergo a special action to thereby rotate the adjust wedge member 29, which serves as an adjustment member, accordingly. Through the rotation of the adjust wedge member 29, the attitude of the diaphragm spring 25 is modified, thereby compensating for the above-mentioned time-course variations. This compensation operation (adjustment) will next be described with reference to the routines shown in FIGS. 10 to 13.

Figure 10:
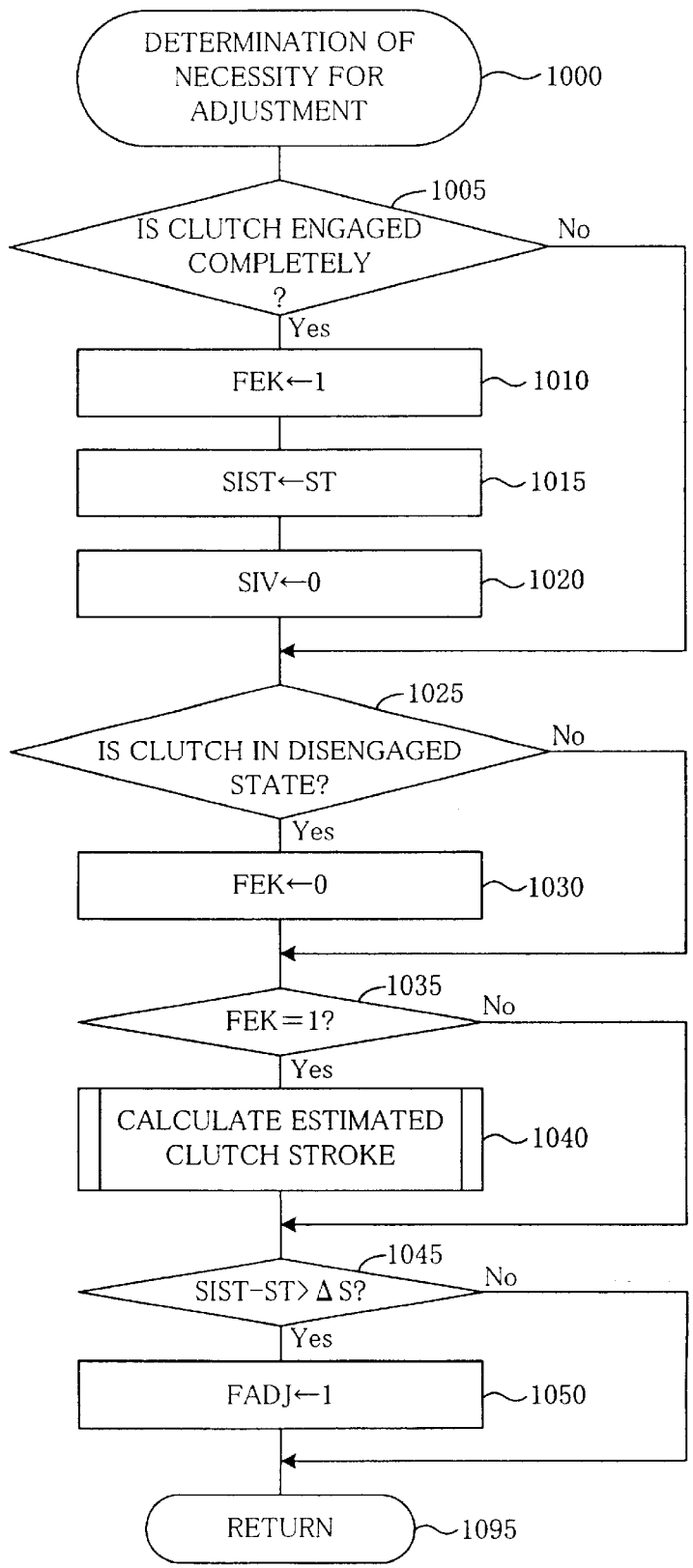
FIG. 10 is a flowchart showing a program to be executed by a CPU shown in FIG. 1.

A routine shown in FIG. 10 determines the necessity for performing the above-described adjustment so as to compensate for the above-mentioned time-course variations. The CPU 41 executes this routine repeatedly at predetermined intervals. When predetermined timing is reached, the CPU 41 starts executing the routine from step 1000. In step 1005, the CPU 41 determines whether or not the clutch 20 (clutch disk 23) has been completely engaged. Specifically, when the stroke ST is equal to a predetermined stroke STKIG0, the CPU 41 determines that the clutch 20 is engaged completely. When the stroke ST is greater than the stroke STKIG0, the CPU 41 determines the clutch 20 is not engaged completely.

When the clutch 20 is engaged completely, the CPU 41 makes a "Yes" determination in step 1005 and proceeds to step 1010. In step 1010, the CPU 41 sets the value of an estimation calculation enabling flag FEK to "1." The estimation calculation enabling flag FEK is used to determine whether to permit execution of a calculation in step 1040 described later to estimate a clutch stroke. Next, the CPU 41 proceeds to step 1015. In step 1015, the CPU 41 sets the value of an estimated clutch stroke SIST to a present stroke ST (a value detected by the stroke sensor 37) to thereby initialize the estimated clutch stroke SIST. Subsequently, the CPU 41 proceeds to step 1020. In step 1020, the CPU 41 sets the value of an estimated clutch stroke speed SIV to "0" to thereby initialize the estimated clutch stroke speed SIV. Then, the CPU 41 proceeds to step 1025. Notably, in step 1005, when the CPU 41 determines that the clutch 20 is not engaged completely, the CPU 41 jumps to step 1025.

In step 1025, when the CPU 41 determines whether or not the clutch 20 is disengaged. Specifically, when the stroke ST is greater than a predetermined stroke STHIKG, which is greater than the predetermined stroke STKIG0, the CPU 41 determines that the clutch 20 is disengaged, but otherwise the CPU 41 determines that the clutch 20 is not disengaged. When the clutch 20 is disengaged, the CPU 41 makes a "Yes" judgment in step 1025 and proceeds to step 1030. In step 1030, the CPU 41 sets the value of the estimation calculation enabling flag FEK to "0."

Next, the CPU 41 proceeds to step 1035. In step 1035, the CPU 41 determines whether or not the value of the estimation calculation enabling flag FEK is "1." When the value is "1," the CPU 41 proceeds to step 1040. In step 1040, the CPU 41 executes the subroutine shown in FIG. 11 in order to estimate a clutch stroke.

The estimated clutch stroke calculation will next be described with reference to FIG. 11. First, the CPU 41 proceeds from step 1100 to step 1105. In step 1105, the CPU 41 calculates a new estimated motor current SIIM according to the calculation expression shown in step 1105 by use of the last calculated estimated motor current SIIM (initial value: "0") and a current IM which the clutch control circuit 40 instructs at present to apply to the electric motor 32 (i.e., motor current at present). In the expression shown in step 1105, Kn is a predetermined constant of 0 to 1. Through this calculation, a time delay (time-lag of the first order) is imparted to the estimated motor current SIIM with respect to the motor current IM at present. That is, the calculation considers a current delay caused by a motor inductance, thereby obtaining a current flowing to the electric motor 32 at higher accuracy.

Next, the CPU 41 proceeds to step 1110. In step 1110, the CPU 41 reads the value of the clutch operation counter N from the EEPROM 45. The clutch operation counter N shows the number of changeovers from engagement to disengagement. Specifically, the clutch operation counter N is updated by the routine to count the number of clutch operations as shown in FIG. 12.

Figure 12:
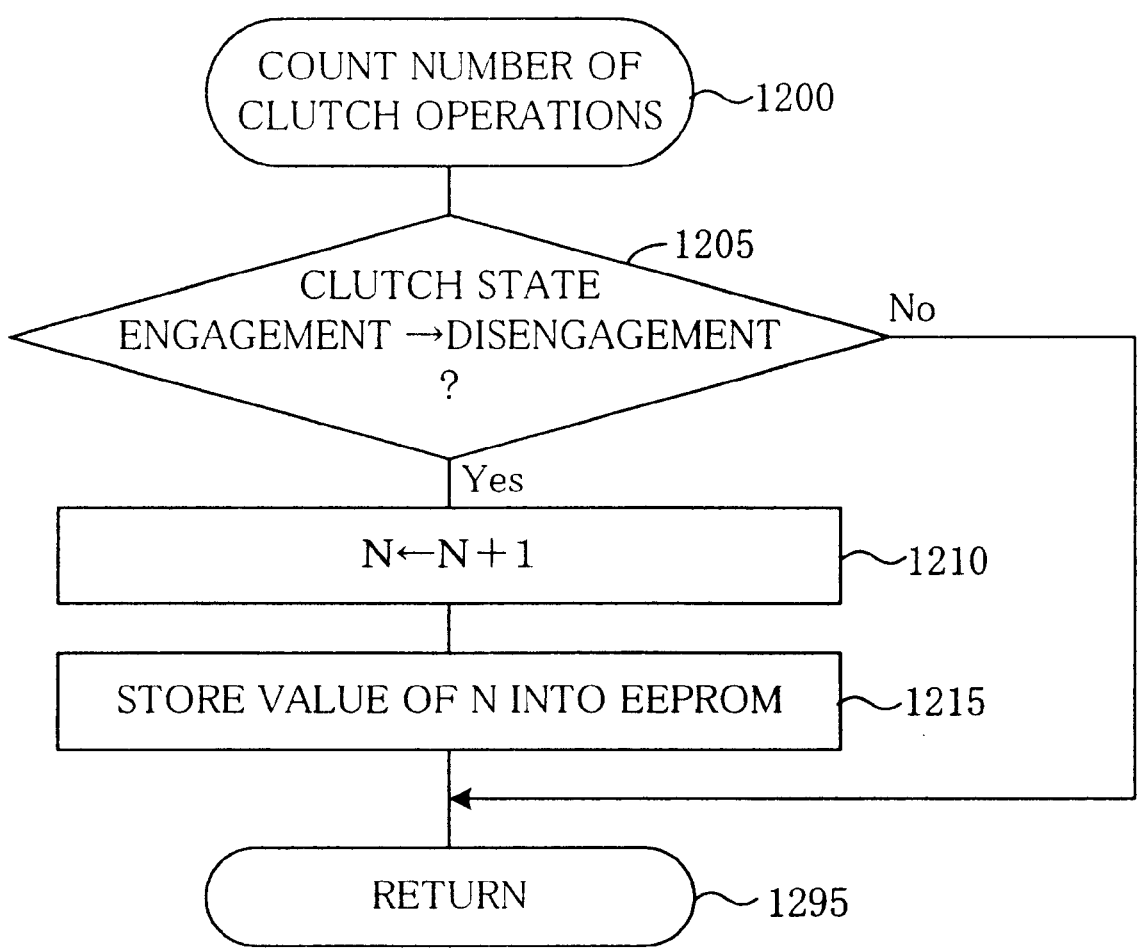
FIG. 12 is a flowchart showing a program to be executed by the CPU shown in FIG. 1.

More specifically, every time a predetermined time elapses, the CPU 41 starts the routine of FIG. 12 from step 1200. The CPU 41 first proceeds to step 1205. In step 1205, the CPU 41 determines whether or not the clutch 20 has shifted from engagement to disengagement. When the CPU 41 makes the "Yes" determination in step 1205, the CPU 41 proceeds to step 1210. In step 1210, the CPU 41 increments the value of the clutch operation counter N by "1." The CPU 41 then proceeds to step 1215, in which the CPU 41 stores the value of the clutch operation counter into the EEPROM 45. The CPU 41 then proceeds to step 1295 in order to terminate the routine. Notably, the reason why the CPU 41 stores the value of clutch operation counter N into the EEPROM 45 in step 1215 is to retain the current number of clutch operations even when the ignition switch 71 is turned off. When the CPU 41 makes the "No" determination in step 1205, the CPU 41 jumps to step 1295. In step 1295, the CPU 41 terminates the routine. In this manner, the clutch operation counter N counts the number of changeovers of the state of the clutch from engagement to disengagement.

Figure 11:
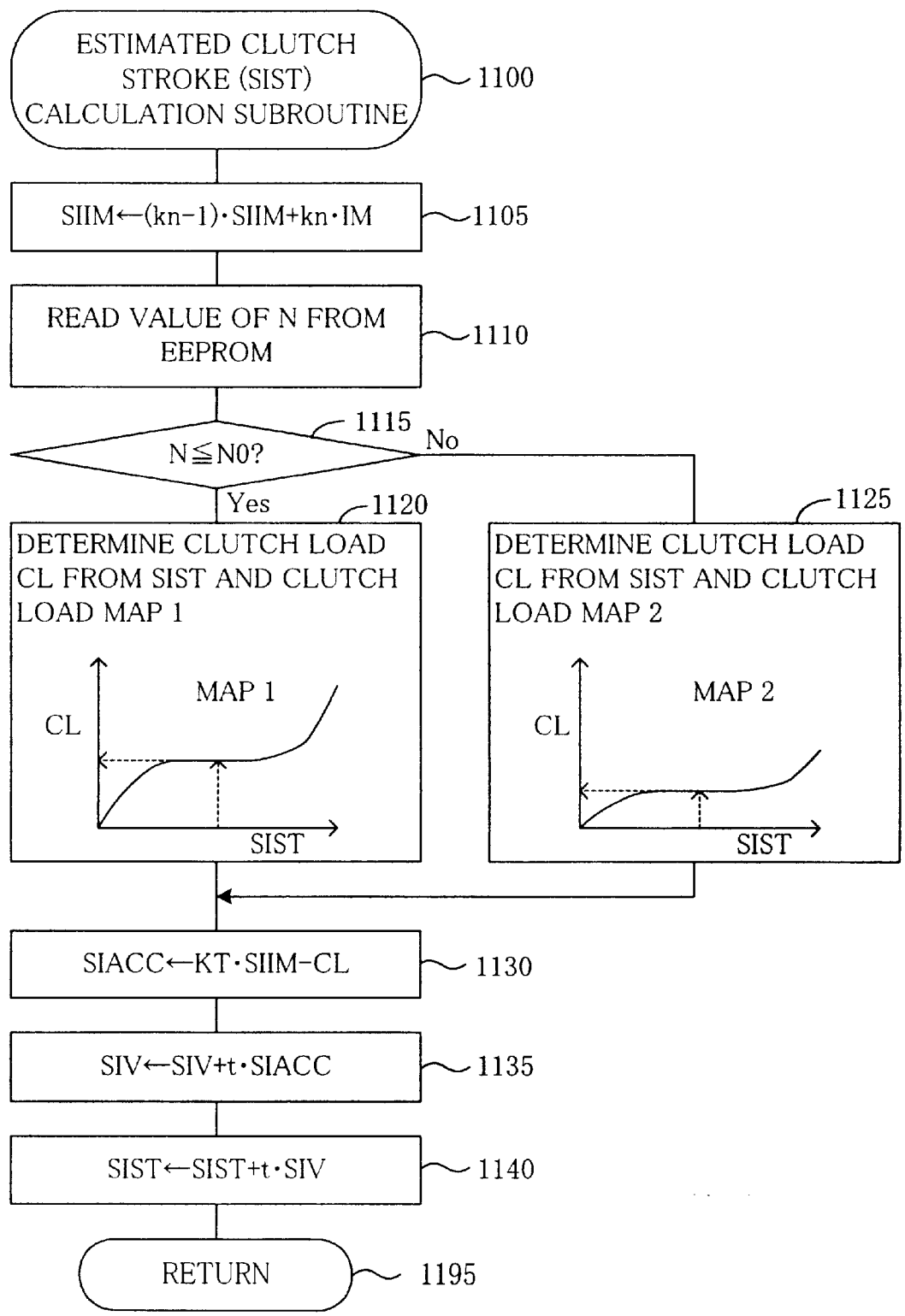
FIG. 11 is a flowchart showing a program to be executed by the CPU shown in FIG. 1.

In the routine of FIG. 11, after reading the value of the clutch operation counter N in step 1110, the CPU 41 proceeds to step 1115. In step 1115, the CPU 41 determines whether or not the read value of the clutch operation counter N is equal to or less than a predetermined value N0. When the CPU 41 makes the "Yes" determination in step 1115, the CPU 41 proceeds to step 1120. In step 1120, the CPU 41 determines a clutch load CL on the basis of the clutch load map 1 (a look-up table 1) shown in step 1120 and the estimated clutch stroke SIST which is available at present (the last estimated clutch stroke SIST).

The estimated clutch stroke SIST is updated in step 1140, which will be described later. When step 1120 is executed for the first time after the value of the estimation calculation enabling flag FEK is changed from "0" to "1," the estimated clutch stroke SIST is equal to the actual stroke ST because of initialization in step 1015 described previously. The clutch load CL is an ideal design load which the electric motor 32 (actuator 30) is to carry (an ideal design load imposed on the electric motor 32) with respect to the stroke ST. The clutch load map 1 to be used in step 1120 shows a predetermined relationship between the clutch stroke ST and the ideal clutch load CL when the number of clutch operations is not greater than the predetermined value N0.

When the number of clutch operations N is greater than the predetermined value N0, the CPU 41 makes "No" determination in step 1115 and proceeds to step 1125. In step 1125, the CPU 41 determines the clutch load CL on the basis of the clutch load map 2 (look-up table 2) shown in step 1125 and the estimated clutch stroke SIST which is available at present (the last estimated clutch stroke SIST). The clutch load map 2 shows a predetermined relationship between the clutch stroke ST and the ideal clutch load CL when the number of clutch operations is greater than the predetermined value N0. At the same estimated clutch stroke SIST, the clutch load CL in the clutch load map 2 is lower than that in the clutch load map 1.

After determining the clutch load CL in step 1120 or 1125, the CPU 41 proceeds to step 1130. In step 1130, the CPU 41 calculates an estimated clutch stroke acceleration SIACC. Specifically, the CPU 41 employs as a new estimated clutch stroke acceleration SIACC a value obtained through subtraction of the clutch load CL from the product of the estimated motor current SIIM and a predetermined constant KT. Since the output torque of the electric motor 32 is proportional to a current flowing to the electric motor 32, the product of the estimated motor current SIIM and a predetermined constant KT represents a force by which the electric motor 32 moves the rod 31 in a reciprocating manner. Accordingly, the value obtained through subtraction of the clutch load CL from the product: i.e., the estimated clutch stroke acceleration SIACC obtained in step 1130 is proportional to a force applied to the rod 31. Thus, the value obtained in step 1130 is an estimated acceleration of the clutch stroke ST.

Next, the CPU 41 proceeds to step 1135. In step 1135, the CPU 41 affinely integrates the estimated clutch stroke acceleration SIACC to thereby obtain the estimated clutch stroke speed SIV. Specifically, the CPU 41 adds the product of the above-obtained estimated clutch stroke acceleration SIACC and an execution cycle t of the present routine (t-SIACC) to the last obtained estimated clutch stroke speed SIV. The CPU 41 employs the resulting value as a new estimated clutch stroke speed SIV.

Then, the CPU 41 proceeds to step 1140. In step 1140, the CPU 41 affinely integrates the estimated clutch stroke speed SIV to thereby obtain the estimated clutch stroke SIST. Specifically, the CPU 41 adds the product of the above-obtained estimated clutch stroke speed SIV and the execution cycle t of the present routine (t•SIV) to the last obtained estimated clutch stroke SIST. The CPU 41 employs the resulting value as a new estimated clutch stroke SIST. Subsequently, the CPU 41 proceeds to step 1195 to thereby terminate the present routine. In this manner, on the basis of the current IM of the electric motor 32, an ideal (target) clutch stroke (estimated clutch stroke SIST) is determined according to the number of clutch operations N.

After calculating the estimated clutch stroke SIST, the CPU 41 proceeds to step 1045 in FIG. 10. In step 1045, the CPU 41 determines whether or not the difference between the estimated clutch stroke SIST and the actual clutch stroke ST is equal to or greater than a predetermined threshold value ΔS. The "Yes" determination in step 1045 means that time-course variations have advanced (progressed) and therefore an actual stroke greatly differs from an ideal stroke for the same current flowing to the electric motor 32. In this case, adjustment to compensate for time-course variations must be performed; thus, the CPU 41 proceeds to step 1050. In step 1050, the CPU 41 sets the value of an adjustment request flag FADJ to "1." Then, the CPU 41 proceeds to step 1095 and terminates the present routine. Meanwhile, the "No" determination in step 1045 means that there is no need for executing adjustment to compensate for time-course variations. Therefore, the CPU 41 jumps to step 1095 and terminates the present routine. As described above, the CPU 41 determines whether or not execution of adjustment is necessary, and sets the adjustment request flag FADJ accordingly.

Figure 13:
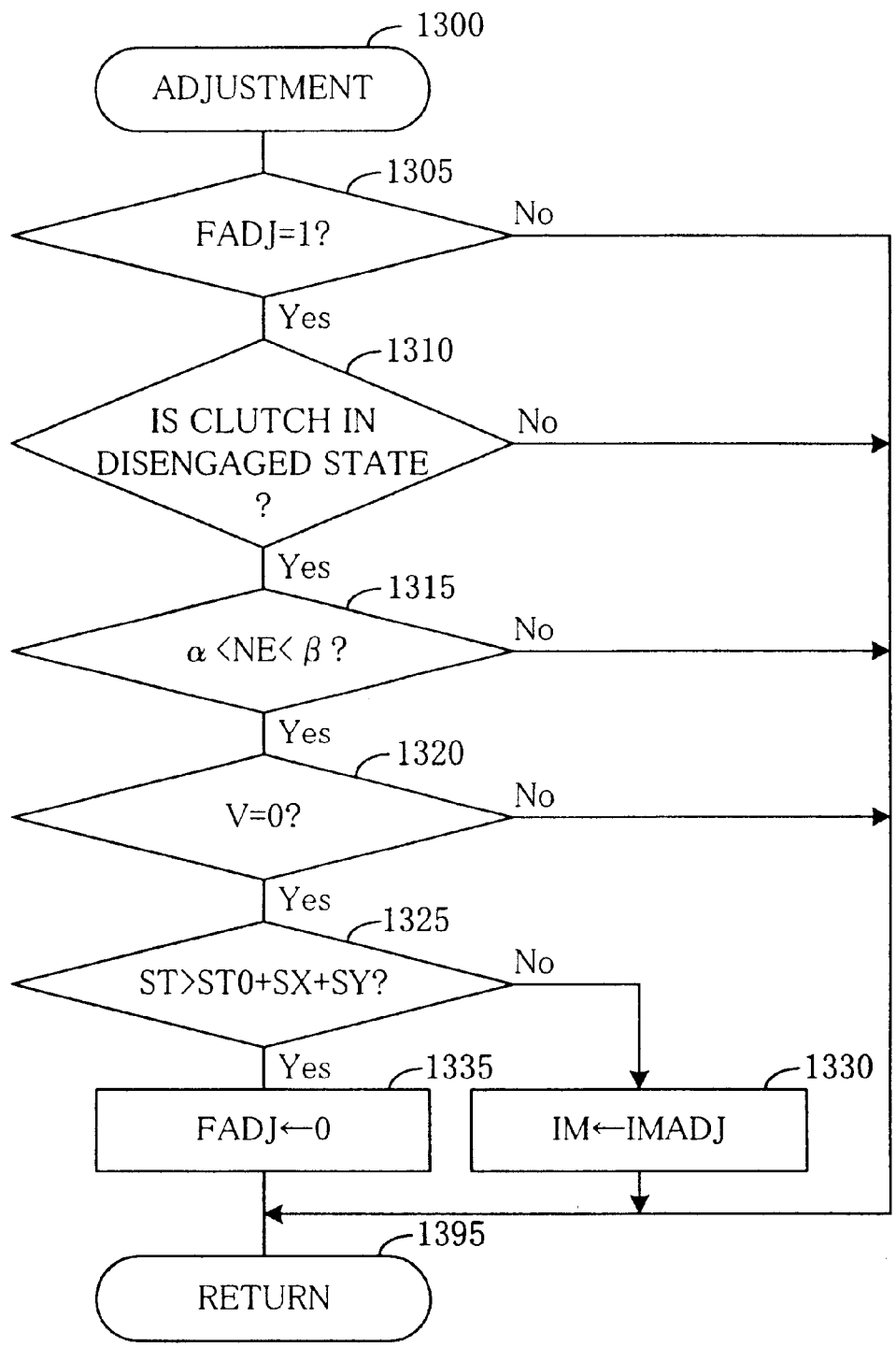
FIG. 13 is a flowchart showing a program to be executed by the CPU shown in FIG. 1.
Figure 14:
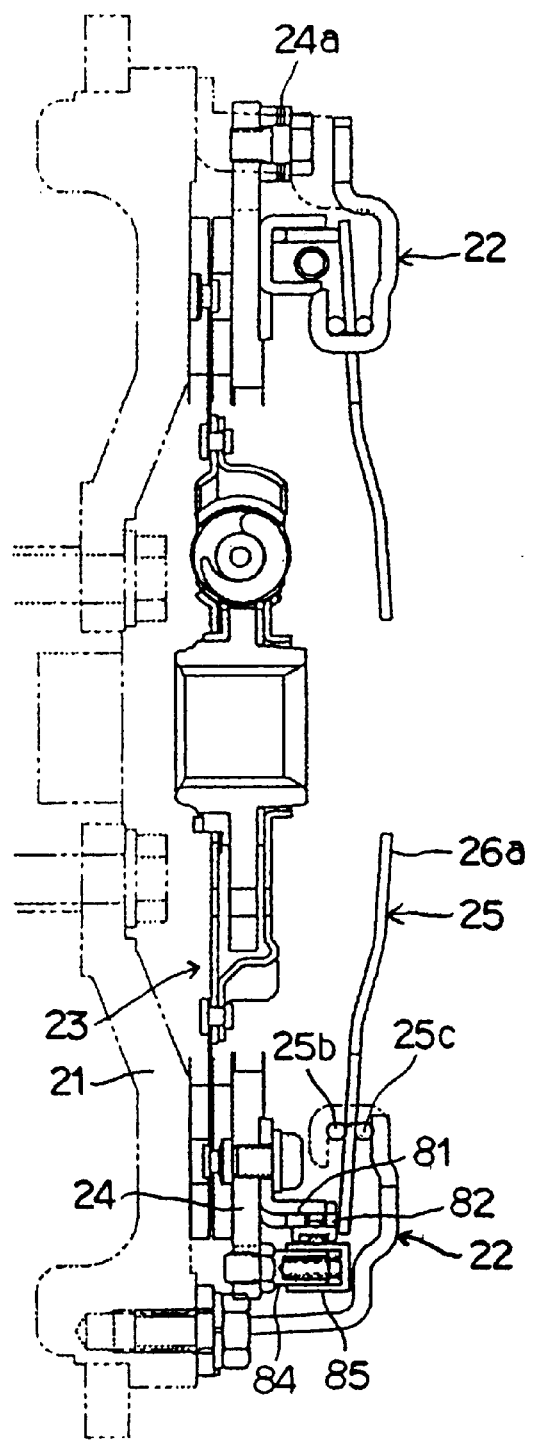
FIG. 14 is a schematic sectional view showing a clutch according to a second embodiment of the present invention.
Figure 15:
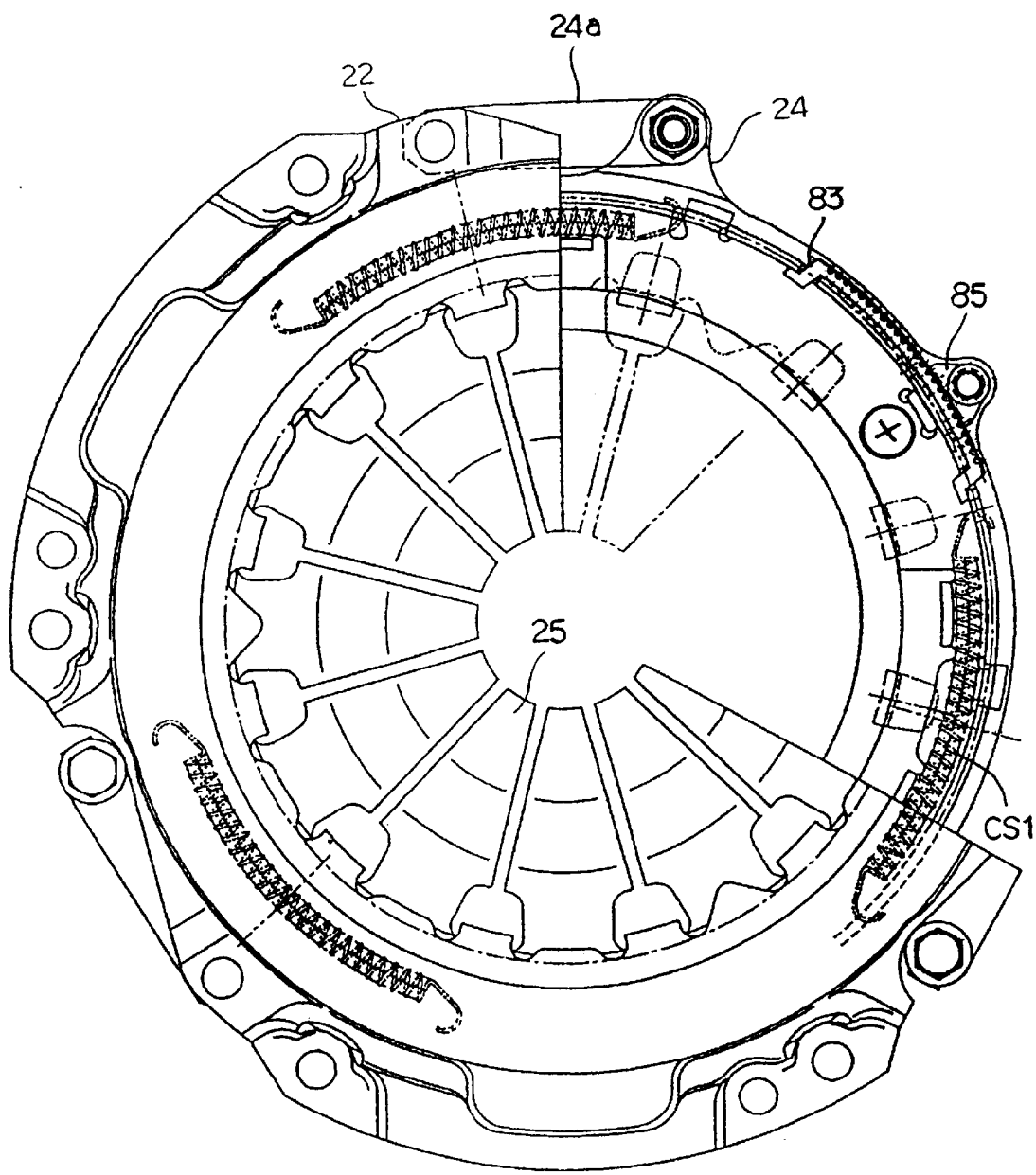
FIG. 15 is a front view of the clutch shown in FIG. 14.
Figure 16:
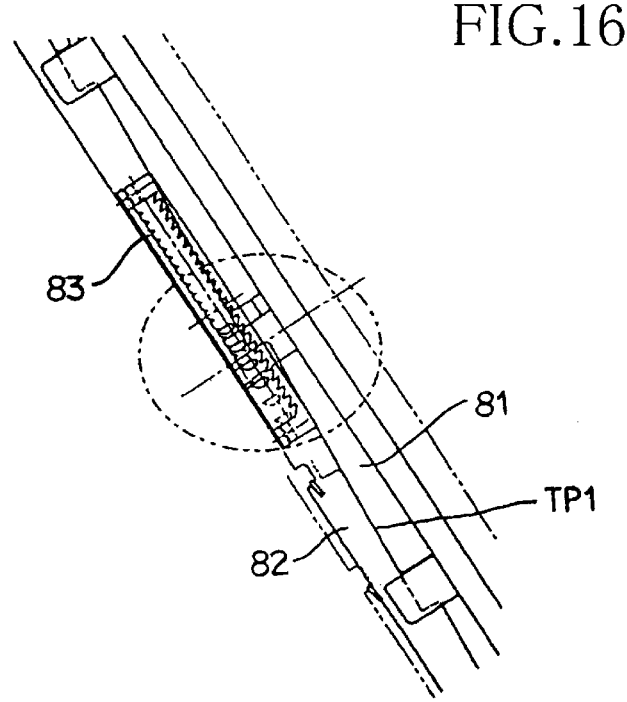
FIG. 16 is a side view of an adjustment member of the clutch shown in FIG. 14.

Next, actions associated with execution of adjustment will be described with reference to the routine shown in FIG. 13. The CPU 41 executes the routine shown in FIG. 13 repeatedly at predetermined intervals. When predetermined timing is reached, the CPU 41 starts executing the routine from step 1300 and proceeds to step 1305 and subsequent steps. In steps 1305 to 1320, the CPU 41 determines whether or not the conditions for execution of adjustment are established.

Description will be continued on the assumption that the conditions for execution of adjustment (steps 1305 to 1320) are all established. In step 1305, the CPU 41 determines whether or not the value of the adjustment request flag FADJ is "1." Step 1305 is provided to perform adjustment only when a request to perform adjustment is present.

Because of the aforementioned assumption, the value of the adjustment request flag FADJ is "1." Thus, the CPU 41 makes the "Yes" determination in step 1305 and proceeds to step 1310. In step 1310, the CPU 41 determines whether or not the clutch disk 23 is disengaged. This is because when the clutch 20 is engaged in a certain state of operation (driving condition of the vehicle), adjustment cannot and should not be performed.

Because of the aforementioned assumption, the clutch disk 23 is disengaged. Thus, the CPU 41 makes the "Yes" determination in step 1310 and proceeds to step 1315. In step 1315, the CPU 41 determines whether or not the engine speed NE is greater than a predetermined low rotational speed α (for example, a minimum rotational speed of 400 rpm required for operation of the engine 10) and less than a predetermined high rotational speed β (for example, a rotational speed of 2000 rpm, at which vibration of the engine 10 begins to increase).

Step 1315 is provided to perform adjustment only when vibration of the engine 10 is small and therefore possibility of resonance of the clutch 20 is small, in order to avoid erroneous adjustment. The reason why adjustment is enabled only when the engine speed NE is greater than the rotational speed α is that, at the time of "geared parking," in which a vehicle is parked while a predetermined shift gear is engaged, execution of adjustment, which involves disengagement of the clutch disk 23, is not desirable. An engine speed NE greater than the predetermined rotational speed α indicates that geared parking is not the case.

Because of the aforementioned assumption, the engine speed NE is greater than the low rotational speed α and less than the high rotational speed β. Thus, the CPU 41 makes the "Yes" determination in step 1315 and proceeds to step 1320. In step 1320, the CPU 41 determines whether or not the vehicle speed V is "0." Step 1320 is provided to avoid erroneous adjustment which may be caused by vibration of a traveling vehicle. Because of the aforementioned assumption, the vehicle is halted, so that the vehicle speed V is "0." Thus, the CPU 41 makes the "Yes" determination in step 1320 and proceeds to step 1325.

In step 1325, the CPU 41 determines whether or not the stroke ST is greater than the total of a stroke ST0, a stroke SX, and a stroke SY (ST0+SX+SY). As mentioned previously, the stroke ST0 is a stroke ST as established when the clutch 20 is disengaged during regular vehicle operation. The stroke SY is a stroke corresponding to the distance Y between the contact portion 24b of the pressure plate 24 and the pressure stopper portion 22d of the clutch cover 22. The stroke SX is a stroke corresponding to an adjustment amount X by which an outer circumferential portion of the diaphragm spring 25 is moved away from an outer circumferential portion of the pressure plate 24 through current adjustment.

At this stage, since the clutch 20 is in the regular disengaged state, the stroke ST is equal to ST0. Accordingly the CPU 41 makes the "No" determination in step 1325 and proceeds to step 1330. In step 1330, the CPU 41 sets the current IM of the electric motor 32 to an adjustment current IMADJ. As a result, the stroke ST begins to gradually approach the criterion value (ST0+SX+SY) shown in step 1325. Subsequently, the CPU 41 proceeds to step 1395 and terminates the present routine.

The CPU 41 executes the routine at predetermined intervals and therefore continues to see whether or not the conditions for execution of adjustment are established through steps 1305 to 1320 and to see in step 1325 whether or not the stroke ST becomes equal to the criterion value (ST0+SX+SY).

Figure 4B:
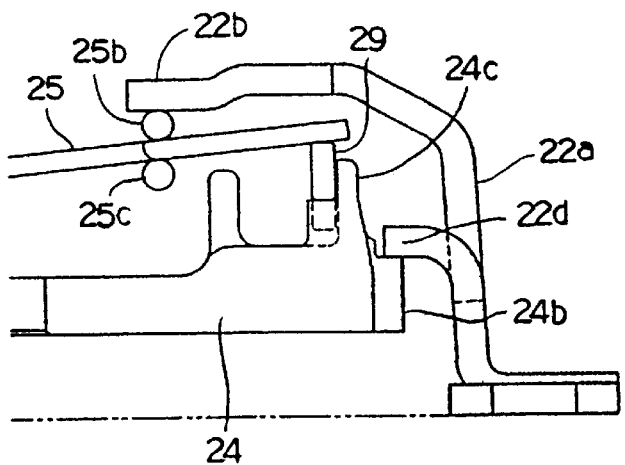

Subsequently, the diaphragm spring 25 undergoes change in attitude from the one shown in FIG. 4A to the one shown in FIG. 4B. Specifically, the diaphragm spring 25 receives a force directed to the flywheel 21 at the force-application portion 26a and thus swings (undergoes change in attitude) about the ring members 25b and 25c. As a result, the contact portion 24b of the pressure plate 24 abuts the pressure plate stopper portion 22d of the clutch cover 22.

At this point of time, since the stroke ST is smaller than the criterion value (the stroke ST assumes the value (ST0+SY)), the CPU 41 makes the "No" determination in step 1325 and executes step 1330. Thus, the current IMADJ continues flowing to the electric motor 32; consequently, the attitude of the diaphragm spring 25 changes further. Since the contact portion 24b of the pressure plate 24 is in contact with the pressure stopper portion 22d of the clutch cover 22, further movement of the pressure plate 24 is disabled. As a result, the distance between an outer circumferential end portion of the diaphragm spring 25 and the taper portion 24d of the pressure plate 24 increases. Consequently, as shown in FIG. 5, the coil springs CS cause the adjust wedge member 29 to rotate in the direction of the arrow such that each taper portion 29a of the adjust wedge member 29 and the corresponding taper portion 24d of the pressure plate 24 contact each other at their higher portions. In this manner, a flat portion of the adjust wedge member 29 follows the movement of the outer circumferential end portion of the diaphragm spring 25.

When after the elapse of a predetermined time, the stroke ST becomes equal to the criterion value (ST0+SX+SY), the CPU 41 makes the "Yes" determination in step 1325 and proceeds to step 1335. In step 1335, the CPU 41 sets the value of the adjustment request flag FADJ to "0." Then, the CPU 41 proceeds to step 1395 and terminates the present routine. Thus, the adjustment is completed. Subsequently, a current corresponding to every state of operation (driving condition of the vehicle) is applied to the electric motor 32, thereby performing appropriate clutch control.

Figure 4C:
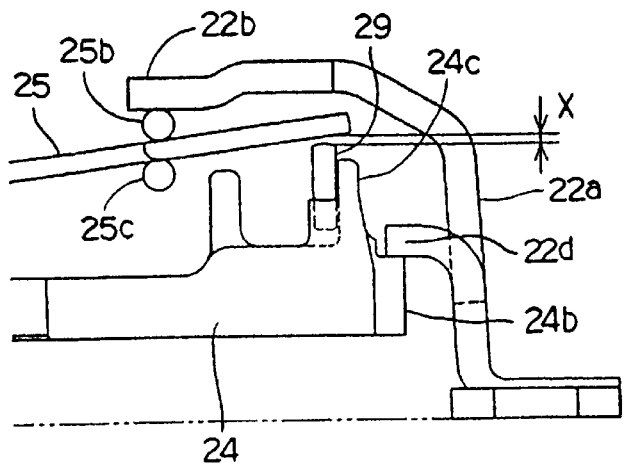

The above adjustment causes the distance between the diaphragm 25 and the pressure plate 24 to increase by the adjustment amount X (see FIG. 4C). As a result, the attitude of the diaphragm varies (changes), causing modification of a press-contact load imposed on the clutch disk 23 as represented by the arrow of FIG. 9 (accordingly, modification of a load of operation of the clutch 20). Through modification of the press-contact load, time-course variations of the clutch (time-course variations in operating characteristics of the clutch) are compensated.

Next will be described the case where in execution of the routine shown in FIG. 13, any one of the conditions for execution of adjustment (steps 1305 to 1320) fails to be established. The CPU 41 makes the "No" determination in any one of steps 1305 to 1320 and proceeds to step 1395. In step 1395, the CPU 41 terminates the present routine. Subsequently, a current corresponding to every state of operation is applied to the electric motor 32, thereby performing appropriate clutch control.

As described above, according to the first embodiment, the attitude of the diaphragm spring 25 is modified according to the number of clutch operations, thereby controlling the clutch-operating load; i.e., the press-contact load, in an ideal manner. As a result, clutch-operating characteristics are maintained in a favorable manner, and an unnecessarily high load is not imposed on the actuator 30, thereby reducing power consumption and improving durability of the actuator 30.

Next, a clutch apparatus according to a second embodiment of the present invention will be described with reference to FIGS. 14 to 21. A clutch according to the second embodiment differs from that according to the first embodiment in an adjustment mechanism (adjustment means or adjustment member) disposed between an outer circumferential portion of the pressure plate 24 and an outer circumferential portion of the diaphragm spring 25. Same members as those of the first embodiment are denoted by common reference numerals, and repeated description thereof is omitted.

Figure 19:
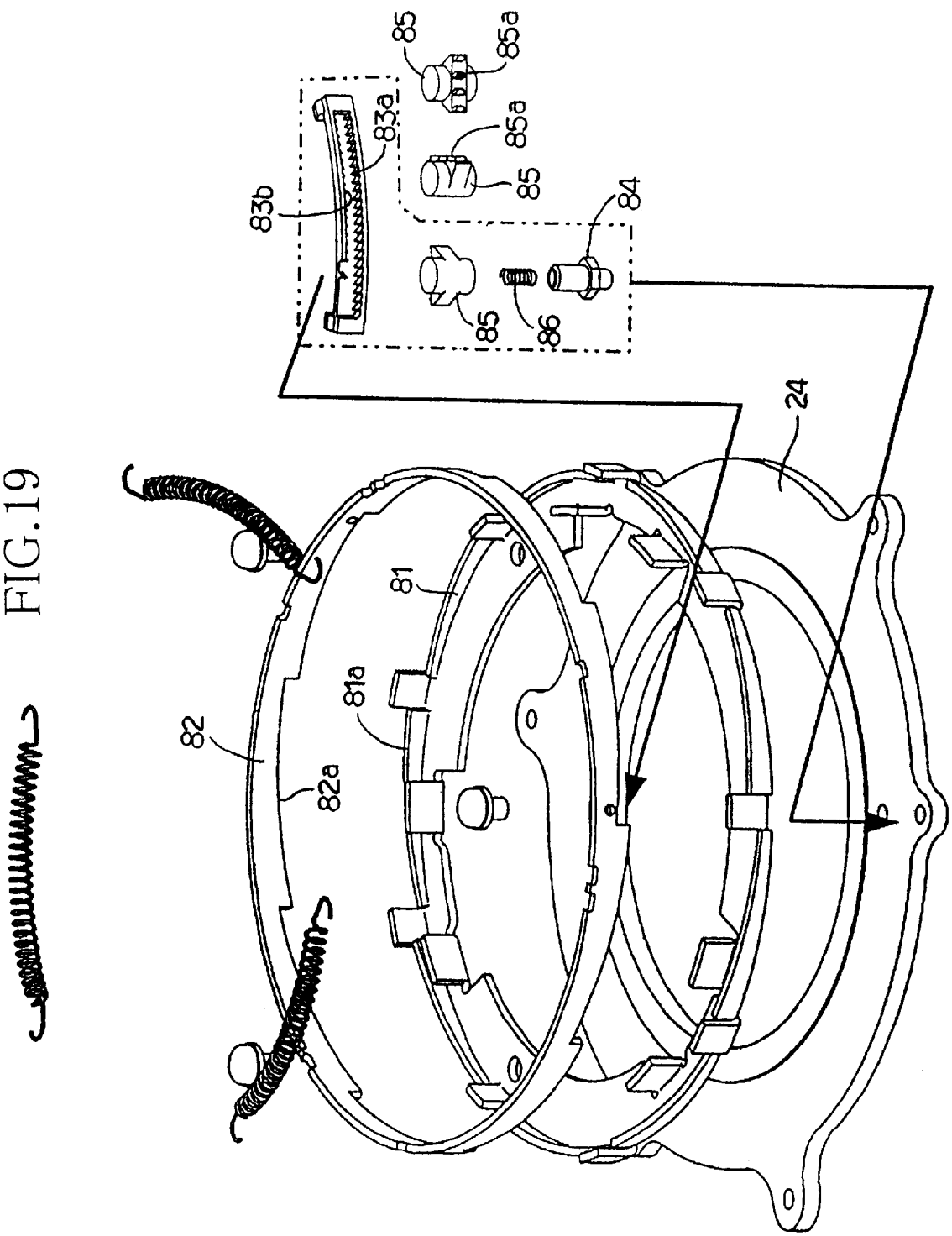
FIG. 19 is an exploded perspective view showing the pressure plate and the adjustment member of the clutch shown in FIG. 14.

In the second embodiment, an annular taper member 81 is fixedly attached to an outer circumferential portion of the pressure plate 24 such that a plurality of taper portions 81a of the taper member 81 face the diaphragm spring 25 (see FIG. 19). The taper portions 81a assume the form of sawteeth. An adjust wedge member 82, which serves as a portion of the adjustment means, is disposed between the taper portions 81*a* and an outer circumferential portion of the diaphragm spring 25.

Figure 17:
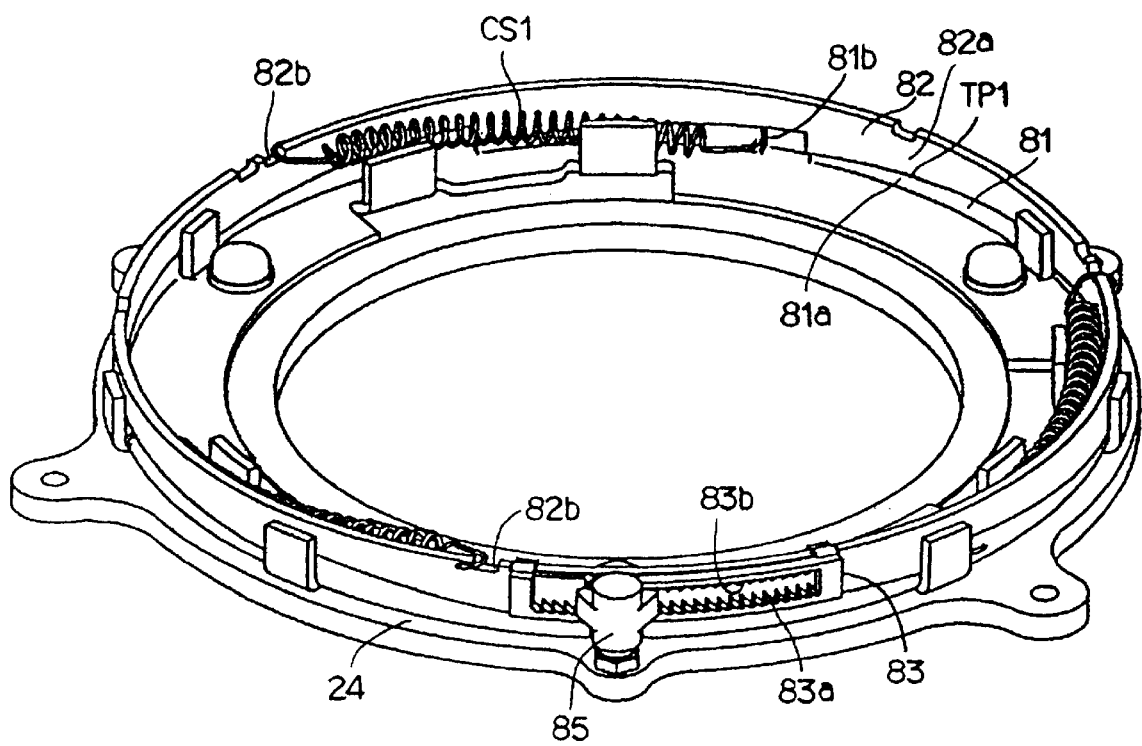
FIG. 17 is a perspective view showing a pressure plate and the adjustment member of the clutch shown in FIG. 14.

The adjust wedge member 82 assumes the form of a ring and is held by the taper member 81 in such a manner as to be coaxially rotatable with the taper member 81. The adjust wedge member 82 includes a plurality of taper portions 82*a*, each of which assumes the same shape as that of the taper portion 81*a*. As shown in FIG. 17, the taper portions 82*a* of the adjust wedge member 82 and the corresponding taper portions 81*a* of the taper member 81 abut each other at the corresponding taper planes TP1. An end face of the adjust wedge member 82 which faces the diaphragm spring 25 is flat.

As shown in FIG. 17, cuts 82*b* are formed at appropriate positions on the end face of the adjust wedge member 82 which faces the diaphragm spring 25. Catch portions 81*b* are formed at appropriate positions on the taper member 81, which is fixedly attached to the pressure plate 24. End portions of a stretched coil spring CS1 are caught by the corresponding cut 82*b* and catch portion 81*b*. The thus-installed coil springs CS1 apply a force to the pressure plate 24 (taper member 81) and the adjust wedge member 82 in such a manner as to rotate the pressure plate 24 and the adjust wedge member 82 in mutually opposite directions such that the tooth-crest of each of the taper portions 81*a* of the taper member 81 and the corresponding tooth-crest of each of the taper portions 82*a* of the adjust wedge member 82 mutually approach.

An adjust rack 83 is fixedly attached to the outer circumferential surface of the adjust wedge member 82. The adjust rack 83 includes first sawteeth 83*a* (or triangular teeth arranged in an equally spaced manner) formed in a condition standing toward the diaphragm spring 25 and arranged in a circumferential direction of the adjust wedge member 82 and second sawteeth 83*b* formed opposite the first sawteeth 83*a* and shifted by a half pitch with respect to the first sawteeth 83*a*.

A cylindrical member 84, which is open at one end, is fixedly attached to the pressure plate 24 at an appropriate position while the open end faces upward. A cylindrical adjust pinion 85, which is open at one end, is fitted to the cylindrical member 84 in a slidably rotatable manner while the open end faces downward. A coil spring 86 is disposed between the cylindrical member 84 and the adjust pinion 85. A plurality of teeth 85*a* formed on the side wall of the adjust pinion 85 are arranged between a row of the first sawteeth 83*a* and a row of the second sawteeth 83*b*, which are formed on the adjust rack 83, so as to be selectively engaged with the first sawteeth 83*a* or the second sawteeth 83*b* (see FIGS. 19 and 21).

Next, the operation of the clutch apparatus according to the second embodiment will be described. As in the case of the first embodiment, during regular vehicle operation, when an unillustrated actuator causes an unillustrated rod to retreat, a central portion of the diaphragm spring 25 moves away from the flywheel 21. At this time, the diaphragm spring 25 swings (i.e., undergoes change in attitude) about the ring members 25*b* and 25*c*, thereby moving the adjust wedge member 82 toward the flywheel 21 through application of pressure. As a result, the pressure plate 24 receives a force which urges the pressure plate 24 toward the flywheel 21 via the taper member 81, thereby gripping the clutch disk 23 in cooperation with the flywheel 21. Thus, the clutch disk 23 is engaged with the flywheel 21 to thereby rotate unitarily with the flywheel 21, thereby transmitting the power of the engine 10 to the transmission 11.

Figure 18:
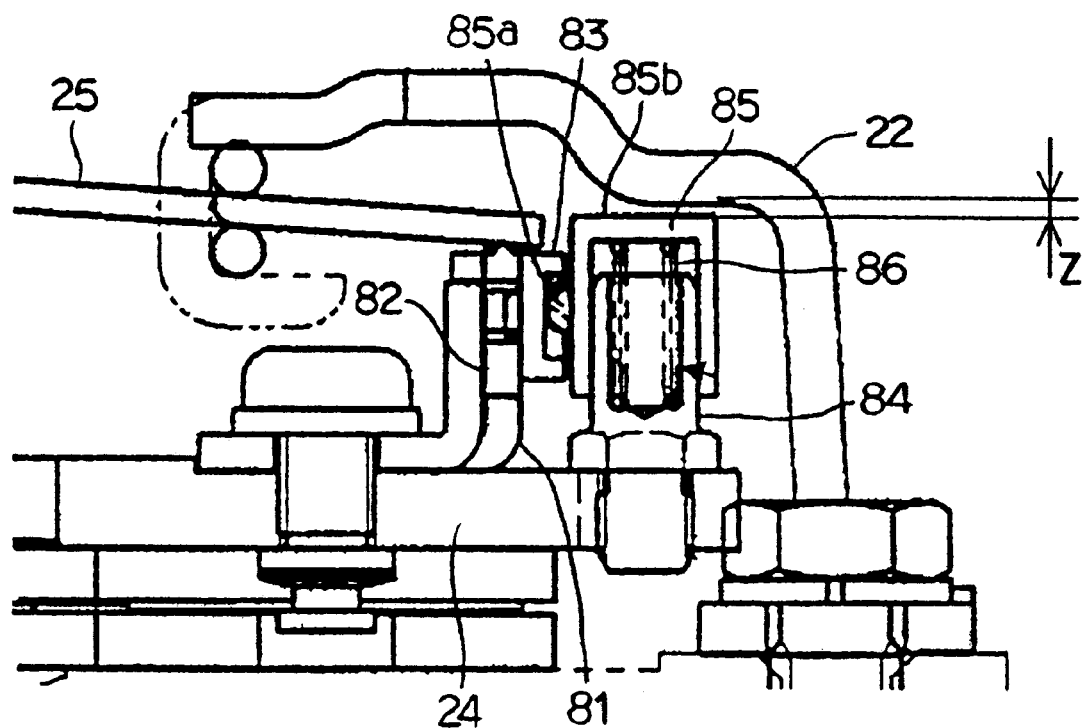
FIG. 18 is an enlarged view showing the adjustment member and its peripheral members of the clutch shown in FIG. 14.
Figure 21A:
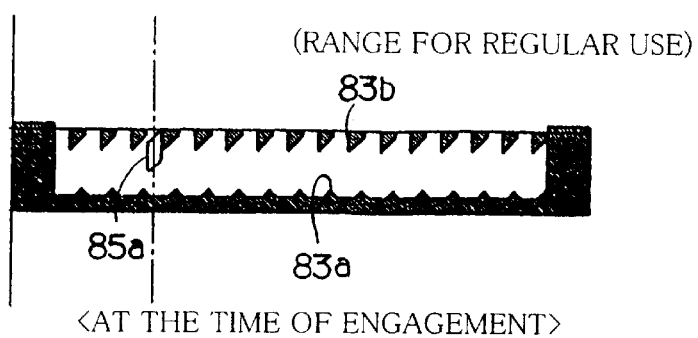
FIGS. 21A to 21D are views for explaining action of the clutch shown in FIG. 14.

In the above-mentioned clutch-engaged state during regular vehicle operation, as shown in FIG. 18, an end face 85*b* of the adjust pinion 85 is not in contact with the clutch cover 22. Thus, as schematically shown in FIG. 21A, engagement of the teeth 85*a* of the adjust pinion 85 with the second sawteeth 83*b* of the adjust rack 83 is maintained. As a result, the adjust wedge member 82 does not rotate with respect to the pressure plate 24.

Next will be described an operation to disengage the clutch so as not to transmit the power of the engine 10 to the transmission 11. An unillustrated electric motor is rotated so as to advance the rod, thereby moving an unillustrated release bearing toward the flywheel 21 through application of pressure.

Thus, the diaphragm spring 25 receives a force directed towards flywheel 21, at the force-application portion 26*a*, located in the vicinity of a central portion of the diaphragm spring 25. As a result, the diaphragm spring 25 swings (i.e., undergoes change in attitude) about the ring members 25*b* and 25*c*, thereby causing an outer circumferential portion of the diaphragm spring 25 to move away from the flywheel 21. Accordingly, there is reduced the force which presses the pressure plate 24 toward the flywheel 21 via the adjust wedge member 82. Since the pressure plate 24 is connected to the clutch cover 22 by means of the straps 24*a* in such a manner as to be always subjected to a force which urges the pressure plate 24 to move away from the flywheel 21, this force causes the pressure plate 24 to move slightly away from the clutch disk 23. As a result, the clutch disk 23 becomes free, thereby establishing a state in which the power of the engine 10 is not transmitted to the transmission 11.

Figure 21B:
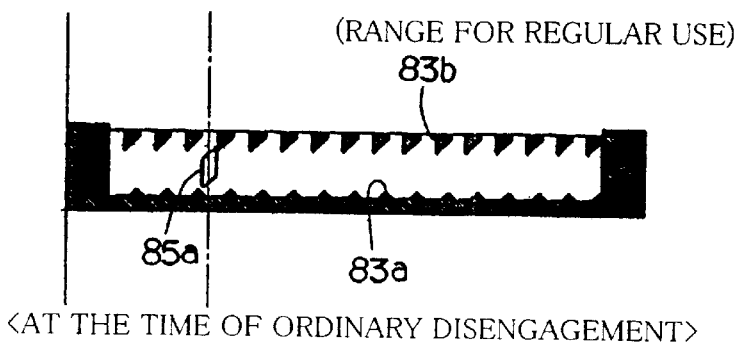

The stroke of the rod of the actuator is controlled such that in the thus-established clutch-disengaged state during regular vehicle operation, the end face 85*b* of the adjust pinion 85 abuts the clutch cover 22 so as to slightly compress the spring 86. Through employment of such control, as schematically shown in FIG. 21B, engagement of the teeth 85*a* of the adjust pinion 85 with the second sawteeth 83*b* of the adjust rack 83 is maintained. As a result, the adjust wedge member 82 does not rotate with respect to the pressure plate 24. Notably, the stroke of the rod may be controlled such that even in the clutch-disengaged state during regular vehicle operation, as shown in FIG. 18, a slight clearance Z is maintained between the end face 85*b* of the adjust pinion 85 and the clutch cover 22. In this case, a clutch-disengaging operation during regular vehicle operation does not involve mutual sliding between the adjust pinion 85 and the cylindrical member 84, thereby reducing wear of the members which would otherwise increase due to frequent mutual sliding between the members.

Next, adjustment for compensation for time-course variations in the clutch apparatus will be described with reference to FIG. 20, which is used in place of the routine of FIG. 13. The routine of FIG. 20 differs from that of FIG. 13 only in that step 2025 replaces step 1325. Accordingly, among the steps shown in FIG. 20, steps identical to those shown in FIG. 13 are denoted by common reference numerals with those of FIG. 13, and repeated description thereof is omitted. Notably, also in the second embodiment, the routines of FIGS. 10 to 12 are executed at predetermined intervals, thereby setting the adjustment request flag FADJ to "1" or "0" and counting the number of clutch operations N.

Figure 20:
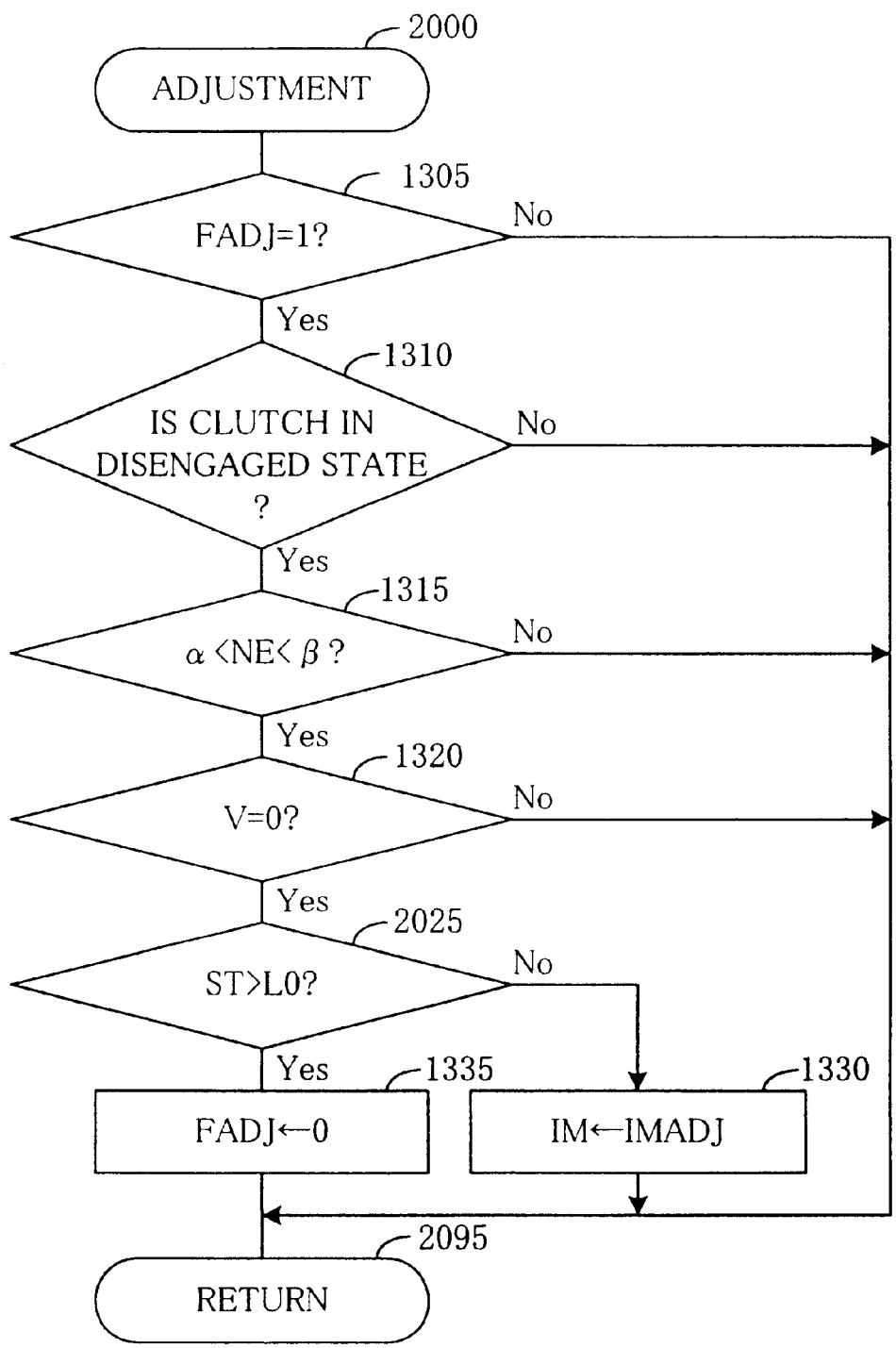
FIG. 20 is a flowchart showing a program to be executed by a CPU of a clutch apparatus according to the second embodiment.

The CPU 41 starts executing the routine of FIG. 20 from step 2000. At this timing, when the conditions for permitting adjustment are established, the CPU 41 makes the "Yes"

determination in all of steps 1305 to 1320 and proceeds to step 2025. In step 2025, the CPU 41 determines whether or not the stroke ST of the rod is greater than a predetermined threshold L0.

The threshold L0 is set sufficiently greater than a stroke as established when the clutch is disengaged during regular vehicle operation. Thus, when the CPU 41 proceeds to step 2025 upon first establishment of the conditions of steps 1305 to 1320, the stroke ST is less than the predetermined threshold L0. Therefore, the CPU 41 makes the "No" determination in step 2025 and proceeds to step 1330. In step 1330, the CPU 41 sets the current IM flowing to the electric motor 32 to a sufficiently large predetermined current IMADJ. Subsequently, the CPU 41 proceeds to step 2095 and terminates the present routine.

Subsequently, the CPU 41 repeatedly performs steps 1305 to 1320 and 2025 at predetermined intervals to determine through steps 1305 to 1320 whether or not the conditions for execution of adjustment are established and to determine in step 2025 whether or not the stroke ST is greater than the threshold L0. When any one of the conditions for execution of adjustment fails to be established before the stroke ST reaches the threshold L0, the CPU 41 makes the "No" determination in the corresponding step of 1305 to 1320 and proceeds to step 2095. In step 2095, the CPU 41 terminates the present routine.

When the conditions for execution of adjustment are maintained, the current of the electric motor 32 is held at the current IMADJ. Accordingly, the attitude of the diaphragm spring 25 continues to change. When a predetermined time elapses, the end face 85b of the adjust pinion 85 abuts the clutch cover 22. This abutment prevents further movement of the adjust pinion 85. However, since the pressure plate 24 receives a force which is generated by the straps 24a extending between the pressure plate 24 and the clutch cover 22 and urges the pressure plate 24 to move away from the flywheel 21, the pressure plate 24 moves further against the force of the spring 86.

Figure 21C:
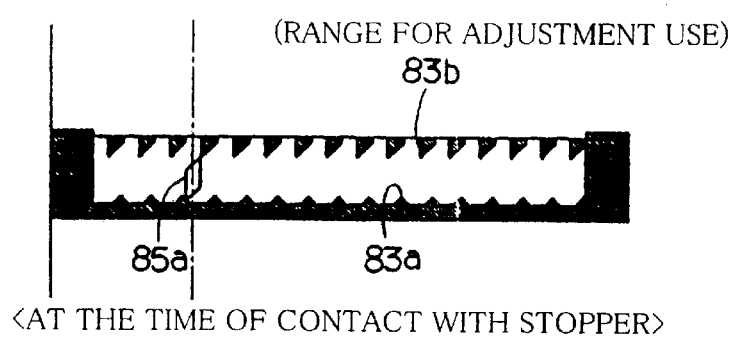
Figure 21D:
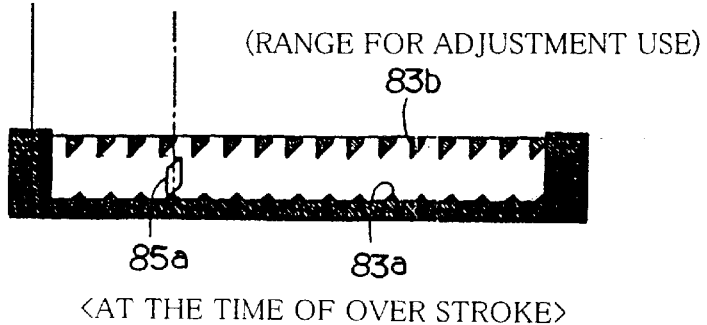

As a result, the relative position between the adjust rack 83 and the adjust pinion 85 begins to change. When a change in the relative position becomes a predetermined amount or greater, as shown in FIG. 21C, the teeth 85a of the adjust pinion 85 and the second sawteeth 83b are disengaged. As a result, a force applied by the coil springs CS1 causes the adjust wedge member 82 to rotate with respect to the pressure plate 24 (taper member 81). In this state, the teeth 85a of the adjust pinion 85 and the first sawteeth 83a are in such a position as to be able to mutually engage. Accordingly, when the teeth 85a of the adjust pinion 85 engage the first sawteeth 83a, further rotation of the adjust wedge member 82 is prevented. As a result of the above-described action, the position of contact between the taper portion 81a of the taper member 81 and the corresponding taper portion 82a of the adjust wedge member 82-changes by half the pitch of the first sawteeth 83a (second sawteeth 83b).

Subsequently, after the elapse of a predetermined time, the stroke ST becomes greater than the threshold L0. The CPU 41 makes the "Yes" determination in step 2025 and proceeds to step 1335. In step 1335, the CPU 41 sets the value of the adjustment request flag FADJ to "0" and proceeds to step 2095. In step 2095, the CPU 41 terminates the present routine.

Subsequently, when execution of unillustrated another routine causes the clutch disk 23 to return to a regular disengagement position, the relative position between the adjust rack 83 and the adjust pinion 85 is restored to the regular state. Accordingly, since the teeth 85a of the adjust pinion 85 and the first sawteeth 83a are disengaged, a force applied by the coil springs CS1 causes the adjust wedge member 82 to rotate again with respect to the pressure plate 24 (taper member 81). When the teeth 85a of the adjust pinion 85 engage the second sawteeth 83a, further rotation of the adjust wedge member 82 is prevented. The position of contact between the taper portion 81a of the taper member 81 and the corresponding taper portion 82a of the adjust wedge member 82 changes by another half the pitch of the first sawteeth 83a (second sawteeth 83b). As a result of the above-described action, the attitude of the diaphragm spring 25 during regular vehicle operation is corrected, thereby modifying the clutch-operating load; i.e., the press-contact load, according to the number of clutch operations.

As described above, according to the second embodiment, when the clutch apparatus is in need of compensation for time-course variations (when the value of the adjustment request flag FADJ is "1"), a single execution of adjustment increases the distance between an outer circumferential portion of the pressure plate 24 and an outer circumferential portion of the diaphragm spring 25 by an amount corresponding to a single pitch of the second sawteeth 83b to thereby modify the attitude of the diaphragm spring 25 so as to compensate for time-course variations in the clutch apparatus. According to the second embodiment, through engagement of the teeth 85a and the first sawteeth 83a or the second sawteeth 83b, the rotation of the adjust wedge member 82 is prevented. Thus, the amount of adjustment remains unchanged in a reliable manner during regular vehicle operation, thereby enabling clutch engagement/disengagement in an appropriate condition all the time. Furthermore, according to the second embodiment, the threshold L0 can be a sufficiently large predetermined amount, thereby further facilitating adjustment as compared with the first embodiment, in which the distance between the pressure plate 24 and the diaphragm spring 25 must be increased accurately by the adjustment amount X.

As described above, according to the clutch apparatus of the present invention, the attitude of the diaphragm spring 25 is adjusted according to the number of clutch operations, thereby compensating for, for example, variations in output characteristics of the electric motor 32, resistance variations at sliding portions, and variations in the friction coefficient R of the clutch facings 23a and 23b and thus maintaining desirable clutch-operating characteristics all the time. The clutch apparatus is configured such that adjustment is performed when the clutch cover, for example, is less influenced by vehicle vibration, thereby reducing the possibility of excessive modification of the attitude of the diaphragm spring 25.

Notably, modifications and variations of the present invention are possible without departing from the scope of the invention. For example, in place of the actuator 30 which employs the electric motor 32, there may be employed a hydraulic actuator (hydraulic cylinder) for moving the rod 31 in a reciprocating manner through application of a hydraulic pressure which is controlled by use of, for example, a solenoid valve. Also, according to the first and second embodiments, only when the possibility of resonance of the clutch cover with vehicle vibration is low, the actuator 30 is operated so as to modify the attitude of the diaphragm spring 25 for execution of adjustment. However, control may be performed so as to modify the attitude of the diaphragm spring 25 when any other condition is established. The clutch control circuit 40 and the actuator 30 may be integrated into a single unit or employed in the form of separate components.

According to the first and second embodiments, the number of clutch operations is directly counted, and the press-contact load is modified according to the counted number of clutch operations. However, the press-contact load may be modified according to, for example, a measured travel distance or a measured driving time, which indirectly represent the number of clutch operations. According to the first and second embodiments, the press-contact load is reduced with the number of clutch operations. However, as represented by a line L3 (a dash-and-dot line) of FIG. 8, the press-contact load may be modified so as to gradually reduce with the number of clutch operations (the value of the counter N) until the number of clutch operations reaches a predetermined value, and subsequently so as to increase with the number of clutch operations.

In this case, when the number of clutch operations (the value of the counter N) reaches a predetermined value, modification of the press-contact load (i.e., modification of the attitude of the diaphragm spring 25 effected by use of an adjustment member) is halted. Subsequently, the attitude of the diaphragm spring 25 as observed when the clutch is engaged varies automatically with the progress of wear of the clutch facings 23a and 23b, thereby modifying the press-contact load. In this case, since the clutch response time is prolonged with the number of clutch operations, a driver can recognize the progress of wear of the clutch facing 23.

This invention can be practiced or embodied in still other ways without departing from the spirit or essential character thereof as described heretofore. Therefore, the preferred embodiments described herein are illustrative and not restrictive, the scope of the invention being indicated by the claims and all variations which come within the meaning of the claims are intended to be embraced therein.

What is claimed is:

1. A clutch apparatus for a vehicle, comprising:
   a clutch disk disposed opposite a flywheel which rotates unitarily with an output shaft of a drive unit;
   a pressure plate for applying a press-contact load to said clutch disk so as to press said clutch disk toward said flywheel to thereby engage said clutch disk with said flywheel;
   a diaphragm spring for causing said pressure plate to generate the press-contact load:
   a release mechanism for applying a force to a predetermined portion of said diaphragm spring to thereby deform said diaphragm spring for disengaging said clutch disk from said flywheel; and
   adjustment means for modifying the press-contact load according to the number of changeovers of the state of said clutch disk from disengagement to engagement or vice versa.

2. A clutch apparatus according to claim 1, said adjustment means modifies the press-contact load such that the press-contact load decreases as the number of changeovers of the state of said clutch disk from disengagement to engagement or vice versa increases.

3. A clutch apparatus according to claim 2, said adjustment means modifies the press-contact load such that the press-contact load decreases stepwise.

4. A clutch apparatus according to claim 1, said adjustment means modifies the press-contact load such that the press-contact load decreases as the number of changeovers of the state of said clutch disk from disengagement to engagement or vice versa increases when the number of changeovers is smaller than a predetermined value, and the press-contact load increases as the number of changeovers increases when the number of changeovers is larger than the predetermined value.

5. A clutch apparatus according to claim 1, said release mechanism comprises an actuator for generating and applying the force to said predetermined portion of said diaphragm spring by moving a member.

6. A clutch apparatus according to claim 5, in which said adjustment means comprises stroke estimation means for estimating a stroke of said member on the basis of an calculated ideal reaction force to be imposed on said member through said diaphragm spring and an estimated force generated by said actuator, and modifies the press-contact load such that an actual stroke of said member becomes equal to the estimated stroke of said member to thereby make adjustment.

7. A clutch apparatus according to claim 6, in which said adjustment means further comprising:
   ideal reaction-force calculation means for calculating said ideal reaction force to be imposed on said member on the basis of a stroke of said member which has been estimated a predetermined time beforehand; and
   actuator force estimation means for estimating said estimated force to be generated by said actuator on the basis of a drive signal issued to said actuator.

8. A clutch apparatus according to claim 7, wherein said stroke estimation means estimates said stroke by integrating stroke speed of said member, the stroke speed being calculated by integrating stroke acceleration of said member which is calculated on the basis of said ideal reaction-force and said estimated force.

9. A clutch apparatus according to claim 6, wherein said adjustment means modifies the press-contact load only when a difference between the actual stroke of said member and the estimated stroke of said member becomes larger than a predetermined amount.

10. A clutch apparatus according to claim 1, wherein said adjustment means does not modify the press-contact load when said clutch disk engages with said flywheel according to driving conditions of the vehicle.

11. A clutch apparatus according to claim 1, wherein said adjustment means does not modify the press-contact load when the vehicle is parked with clutch disk being engaged.

12. A clutch apparatus according to claim 1, wherein said adjustment means does not modify the press-contact load when the rotational speed of the drive unit of the vehicle is lower than a predetermined speed.

13. A clutch apparatus according to claim 1, wherein said adjustment means does not modify the press-contact load when resonance of the clutch occurs due to vibration of the drive unit.

14. A clutch apparatus according to claim 1, wherein said adjustment means does not modify the press-contact load when the rotational speed of a drive unit of the vehicle is higher than a predetermined speed.

15. A clutch apparatus according to claim 1, wherein said adjustment means does not modify the press-contact load when the speed of the vehicle is not zero.

16. A clutch apparatus according to claim 1, wherein said release mechanism comprising:

a release bearing which comes into contact with said diaphragm spring;

a release fork for moving said release bearing through application of pressure;

a rod as of an actuator for deflecting said release fork in order to move said release bearing.

17. A clutch apparatus according to claim 1, wherein said adjustment means includes a mechanism to modify a distance between an outer circumferential portion of said diaphragm spring and said pressure plate.

* * * * *